(12) United States Patent
Riyad

(10) Patent No.: US 12,502,455 B2
(45) Date of Patent: Dec. 23, 2025

(54) ALOE VERA COMPOSITIONS AS DRESSING MATERIAL AND RELATED METHODS OF PRODUCTION

(71) Applicant: Mitra Mashayekhi, Gilbert, AZ (US)

(72) Inventor: Ahmad M. Riyad, Gilbert, AZ (US)

(73) Assignee: Mitra Mashayekhi, Gilbert, AZ (US)

( * ) Notice: Subject to any disclaimer, the term of this patent is extended or adjusted under 35 U.S.C. 154(b) by 319 days.

(21) Appl. No.: 18/452,455

(22) Filed: Aug. 18, 2023

(65) Prior Publication Data

US 2024/0058501 A1 Feb. 22, 2024

Related U.S. Application Data

(60) Provisional application No. 63/399,567, filed on Aug. 19, 2022.

(51) Int. Cl.
| | | |
|---|---|---|
| *A61L 15/40* | (2006.01) | |
| *A61K 9/70* | (2006.01) | |
| *A61K 36/886* | (2006.01) | |
| *A61L 15/44* | (2006.01) | |

(52) U.S. Cl.
CPC .......... *A61L 15/40* (2013.01); *A61K 36/886* (2013.01); *A61L 15/44* (2013.01); *A61K 2236/15* (2013.01); *A61K 2236/333* (2013.01); *A61K 2236/51* (2013.01)

(58) Field of Classification Search
CPC ...... A61L 15/40; A61L 15/44; A61L 2300/30; A61L 2300/404; A61K 36/886; A61K 2236/15; A61K 2236/333; A61K 2236/51; A61K 9/7007; A61F 2013/00157; A61F 13/00063; A61F 13/0203; A61F 13/0289
See application file for complete search history.

(56) References Cited

PUBLICATIONS

Fontana et al.; Adv. Healthcare Mater.; (2017) 6; p. 1601225; published onine Mar. 20, 2017.*

CAS Common Registry for Polyethylene glycol mono(4-tert-octylphenyl) ether (Triton X-100); downloaded Aug. 20, 2025.*

Adamski, M., Fontana, G., Gershlak, J. R., Gaudette, G. R., Le, H. D., & Murphy, W. L. (2018). Two Methods for Decellularization of Plant Tissues for Tissue Engineering Applications. Journal of visualized experiments : JoVE, (135), 57586. https://doi.org/10.3791/57586.

Bennett, Michael D. "Plant Genome Values: How Much Do We Know?" Proceedings of the National Academy of Sciences, National Acad Sciences, www.pnas.org/content/95/5/2011.long, Published Mar. 3, 1998.

Fontana, G., Gershlak, J., Adamski, M., Lee, J. S., Matsumoto, S., Le, H. D., Binder, B., Wirth, J., Gaudette, G., & Murphy, W. L. (2017). Biofunctionalized Plants as Diverse Biomaterials for Human Cell Culture. Advanced healthcare materials, 6(8), 10.1002/adhm.201601225. https://doi.org/10.1002/adhm.201601225.

Gershlak, J. R., Hernandez, S., Fontana, G., Perreault, L. R., Hansen, K. J., Larson, S. A., Binder, B. Y. K., Dolivo, D. M., Yang, T., Dominko, T., Rolle, M. W., Weathers, P. J., Medina-Bolivar, F., Cramer, C. L., Murphy, W. L., & Gaudette, G. R. (2017). Crossing kingdoms: Using decellularized plants as perfusable tissue engineering scaffolds. Biomaterials, 125, 13-22. https://doi.org/10.1016/j.biomaterials.2017.02.011.

Gore, M A, and D Akolekar. "Banana Leaf Dressing for Skin Graft Donor Areas." Burns : Journal of the International Society for Burn Injuries., U.S. National Library of Medicine, Aug. 2003, www.ncbi.nlm.nih.gov/pubmed/12880730.

Hakkarainen et al., "Nanofibrillar Cellulose Wound Dressing in Skin Graft Donor Site Treatment." Journal of Controlled Release, Elsevier, Aug. 1, 2016, www.sciencedirect.com/science/article/pii/S0168365916304990.

Horandl, Elvira. The Evolution of Apomixis. 2012. www.researchgate.net/figure/237201437_Apomixis-records-after-Carman-1997-superimposed-on-a-phylogenetic-tree-of-angiosperm.

* cited by examiner

*Primary Examiner* — Jeffrey T. Palenik

(74) *Attorney, Agent, or Firm* — Pacer K. Udall; Booth Udall, PLC

(57) ABSTRACT

The present invention relates medical dressing and bandages comprising decellularized aloe vera skin and methods of producing medical dressing from aloe vera skin.

20 Claims, 25 Drawing Sheets

Testing batch 2
Day 2
SDS

ALOE VERA COMPOSITIONS AS DRESSING MATERIAL AND RELATED METHODS OF PRODUCTION

CROSS-REFERENCE TO RELATED APPLICATIONS

The application claims the benefit of U.S. Provisional Patent Application No. 63/399,567, filed on Aug. 19, 2022, the contents of which is hereby incorporated herein by reference in their entireties.

FIELD OF THE INVENTION

The invention relates to a novel medical dressing material comprising decellularized aloe vera.

BACKGROUND OF THE INVENTION

The primary purposes of medical dressing have been stopping bleeding from a wound by sealing the wound, protection from infection by acting as physical barrier, absorb exudate, ease pain through compression. Historically, medical dressing is made of cloth, though modern dressing material includes impregnated gauze, plastic films, gels, foams, hydrocolloid, alginates, hydrogels, and polysaccharide pastes. Advancements in dressing material have often been geared toward improving one aspect of the primary purposes of medical dressing (for example, improving exudate absorption) result in specialized medical dressing for a particular type of injury or wound. Thus, the main all-arounder dressing material remains cloth or gauze. Thus, the development of a medical dressing material that provides multifaceted improvements is needed.

SUMMARY OF THE INVENTION

Described herein are medical dressing made of decellularized aloe vera and related methods of production. In some aspects, the medical dressing described herein further comprises an antimicrobial agent, a pro-wound-healing compound, and/or a pain relief agent, wherein the decellularized aloe vera skin is impregnated with the antimicrobial agent, the pro-wound-healing compound, and/or the pain relief agent. The medical dressing comprising decellularized aloe vera may be used in place of dressing in traditional bandages, for skin grafts or facilitating tissue transplantation/growth.

Also disclosed herein are bandages, such as adhesive bandage, comprising the decellularized aloe vera skin. The adhesive bandage described herein comprises a bandage, the decellularized aloe vera skin disclosed herein, and an adhesive, wherein the adhesive provides organic adhesion of the decellularized aloe vera skin to the bandage. In some aspects, the adhesive bandage further comprises an antimicrobial agent, a pro-wound-healing compound, and/or a pain relief agent, wherein the decellularized aloe vera skin is impregnated with the antimicrobial agent, the pro-wound-healing compound, and/or the pain relief agent.

The process of decellularization aloe vera to produce a plant-based medical dressing comprises removing aloe vera gel from an aloe vera leaf thereby isolating aloe vera skin and incubating the aloe vera skin in a detergent solution comprising Triton X-100 (IUPAC: polyethylene glycol mono(4-tert-octylphenyl)) ether for at least four days to produce a decellularized aloe vera skin for use as medical dressing. In some implementations, the aloe vera skin is flash frozen, for example, by storage in temperature of no more than 0° C. for at least 10 minutes. In particular implementations, the aloe vera skin is stored in −80° C. for 30 minutes to 8 hours or 1 hour to 8 hours to produce the flash-frozen aloe vera skin. In some aspects, the aloe vera skin is less than 5 nm thick.

The method of producing the plant-based medical dressing may further comprise cutting the aloe vera leaf into segments prior to removing the aloe vera gel from the aloe vera leaf. In certain implementations, the method further comprises washing the decellularized aloe vera skin to remove the detergent solution and then optionally drying the decellularized aloe vera skin. In some embodiments, the decellularized aloe vera skin is impregnated with an antimicrobial agent, a pro-wound-healing compound, and/or a pain relief agent. In some aspects, the additional ingredient is injected into the veins of the decellularized aloe vera skin. In other aspects, the decellularized aloe vera skin is incubated in a solution comprising the additional ingredient.

In some aspects detergent solution further comprises 1% at least sodium dodecyl sulfate (SDS). In some embodiments, the detergent solution comprises 5% Triton X-100 and 5% SDS, 7.5% Triton X-100 and 7.5% SDS, 10% Triton X-100 and 10% SDS, or 20% Triton X-100 and 10% SDS. In other aspects, the detergent solution consists of Triton X-100 and water. For example, the detergent solution comprises at least 5% Triton X-100, 10%-20% Triton X-100, about 5% Triton X-100, about 7.5% Triton X-100, about 10% Triton X-100, about 15% Triton X-100, or about 20% Triton X-100.

BRIEF DESCRIPTION OF THE DRAWINGS

Figure 7A:
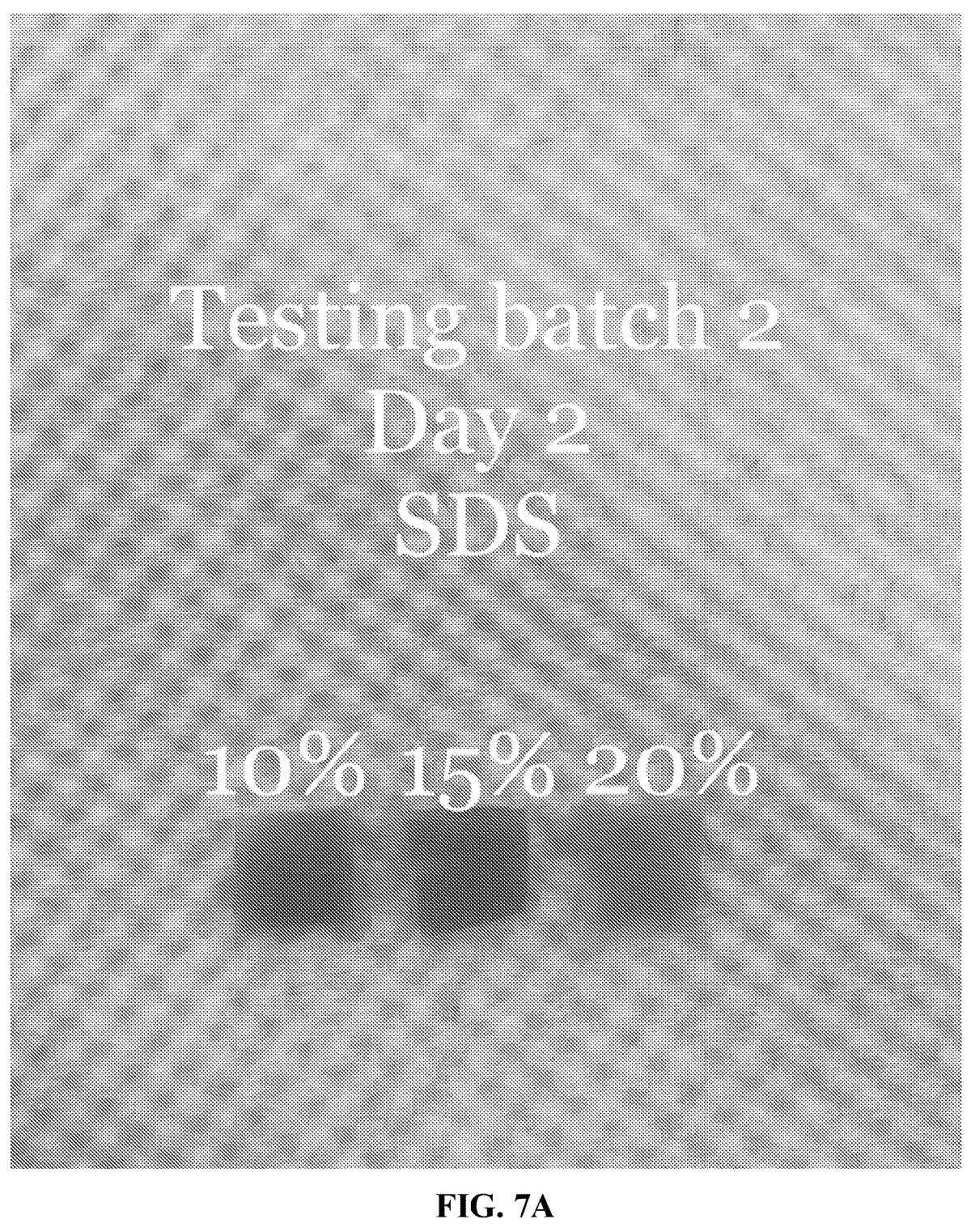

FIGS. 7A and 7B show photographs of the three portions of aloe vera skin after two days and after four days of treatment in their respective concentrations of the SDS solution.

DETAILED DESCRIPTION OF THE INVENTION

Figure 1:
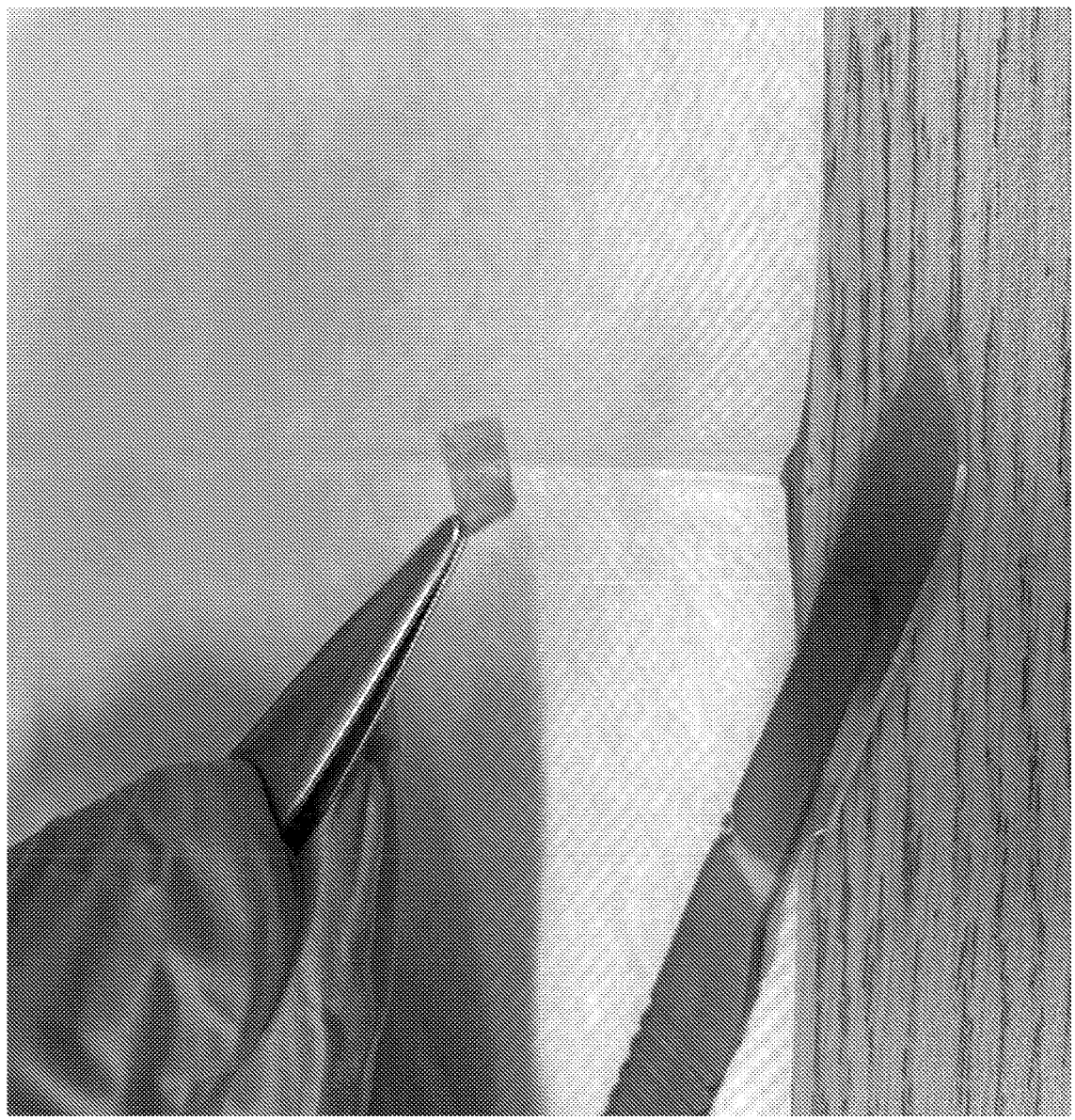
FIG. 1 depicts an exemplary isolated aloe vera portion in which the gel was scraped from the leaf.

Detailed aspects and applications of the invention are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. It should be noted that there are many different and alternative configurations, devices, and technologies to which the disclosed inventions may be applied. The full scope of the inventions is not limited to the examples that are described below.

The singular forms "a," "an," and "the" include plural referents unless the context clearly dictates otherwise. Thus, for example, reference to "a step" includes reference to one or more of such steps.

As used herein, the term "bandage" refers to a piece of material used to hold medical dressing in place.

As used herein, the term "adhesive bandage" refers to a material with adhesive coated on one side that may have include a pad of medical dressing, which is used to over and protect wounds, to hold together the skin edges of a wound, to support an injured part of the body, or to secure objects to the skin. In some aspects, the term refers to the medical device defined in 21 C.F.R. 880.5240.

As used herein, the term "aloe vera skin" refers to the green rind of aloe vera leaf, which comprises the epidermis, cuticle, and chloroplast parenchyma (also referred to as "chlorenchyma"). The term does not encompass filet or the parenchyma, which is commonly described as aloe vera gel. See Fementia et al., "Compositional features of polysaccharides from aloe vera (*Aloe barbadensis* Miller) plant tissues", *Carbohydrate Polymers*, 1999, 39(2): 109-117 for the cellular structure of an aloe vera leaf.

Disclosed herein is a medical dressing material produced from aloe vera (*Aloe barbadensis*). Specifically, the medical dressing material is the extracellular matrix of aloe vera skin and is produced by decellularizing the aloe vera skin. Thus, this method may be used on the unused portions of aloe vera from production of aloe vera gel.

The method comprises isolating aloe vera skin from aloe vera leaf and incubating the aloe vera skin in a detergent solution comprising Triton X-100 for at least four days to produce a decellularized aloe vera skin for use as medical dressing. In some aspects, the aloe vera skin is incubated in the detergent solution comprising Triton X-100 for up to two weeks. In some implementations, the aloe vera skin is flash frozen, for example by storage in temperature of less than 0° C., for no more than a day, prior to incubation with the detergent solution. For example, aloe vera skin is stored at a temperature of about −30° C., about −40° C., about −50° C., about −60° C., about −70° C., or about −80° C. for at least 10 minutes, at least 20 minutes or at least 30 minutes or stored in liquid nitrogen. In certain implementations, the aloe vera skin is stored in −80° C. for 30 minutes to 8 hours to produce the flash-frozen aloe vera skin. In some aspects, the isolated aloe vera skin is less than 5 mm thick, for example about 1 mm thick, about 2 mm thick, about 3 mm thick, about 4 mm thick, or about 5 mm thick.

The detergent solution for decellularizing the aloe vera skin comprises at least 5% Triton X-100. In some implementations, the detergent solution also comprises at least 1% sodium dodecyl sulfate (SDS), for example between 1% to 20% SDS, about 1%, about 5%, about 7.5%, about 10%, about 15%, or about 20% SDS. In some aspects, the detergent solution is a 50/50 mixture of a Triton-X solution and a SDS solution wherein the detergent solution comprises equal concentrations of each detergent at a range of 1% to 20%. In certain such embodiments, the detergent solution comprises 5% Triton X-100 and 5% SDS, 7.5% Triton X-100 and 7.5% SDS, or 10% Triton X-100 and 10% SDS. In other aspects, the detergent solution consists of Triton X-100 and water. In some aspects, the detergent solution comprises 10%-20% Triton X-100. For example, the detergent solution comprises about 5%, about 7.5%, about 10%, about 15%, or about 20% Triton X-100.

In some implementations, the method of producing plant-based medical dressing described herein further comprises washing the decellularized aloe vera skin to remove the detergent solution; and drying the decellularized aloe vera skin. The decellularized aloe vera skin may be washed with any pharmaceutically acceptable liquid, for example, water or saline solution. The method may further comprise impregnating the decellularized aloe vera skin with an additional ingredient to enhance the efficacy and function of the medical dressing. The method of impregnating the decellularized aloe vera skin may be drying the decellularized aloe vera skins and then rehydrating with the additional ingredient. In some implementations, the decellularized aloe vera skin impregnated with the additional ingredient to enhance the efficacy and function of the medical dressing is further dried prior to application to a patient. In other implementations, the decellularized aloe vera skin is impregnated with the additional ingredient to enhance the efficacy and function of the medical dressing immediately prior to application to a patient.

To further enhance the versatility of the decellularized aloe vera skin as medical dressing, the dried decellularized aloe vera skin may be impregnated with an antimicrobial agent, for example, antibacterial compound or an antiseptic. In some aspects, the antimicrobial agent is plant-derived like *arnica* or an antibiotic like neomycin. Thus, certain implementations of the method of producing plant-based medical dressing further comprises incubating the decellularized aloe vera skin with a solution comprising an antimicrobial agent. In other implementations, the method instead comprises injecting an antimicrobial agent into the veins of the decellularized aloe vera skin. In some embodiments, the method comprises impregnating the decellularized aloe vera skin with at least one antimicrobial agent via incubation with a solution comprising an antimicrobial agent and/or injecting the same or another antimicrobial agent into the veins of the decellularized aloe vera skin. Thus, a medical dressing comprising decellularized aloe vera skin and an antimicrobial agent is described herein.

Figure 11:
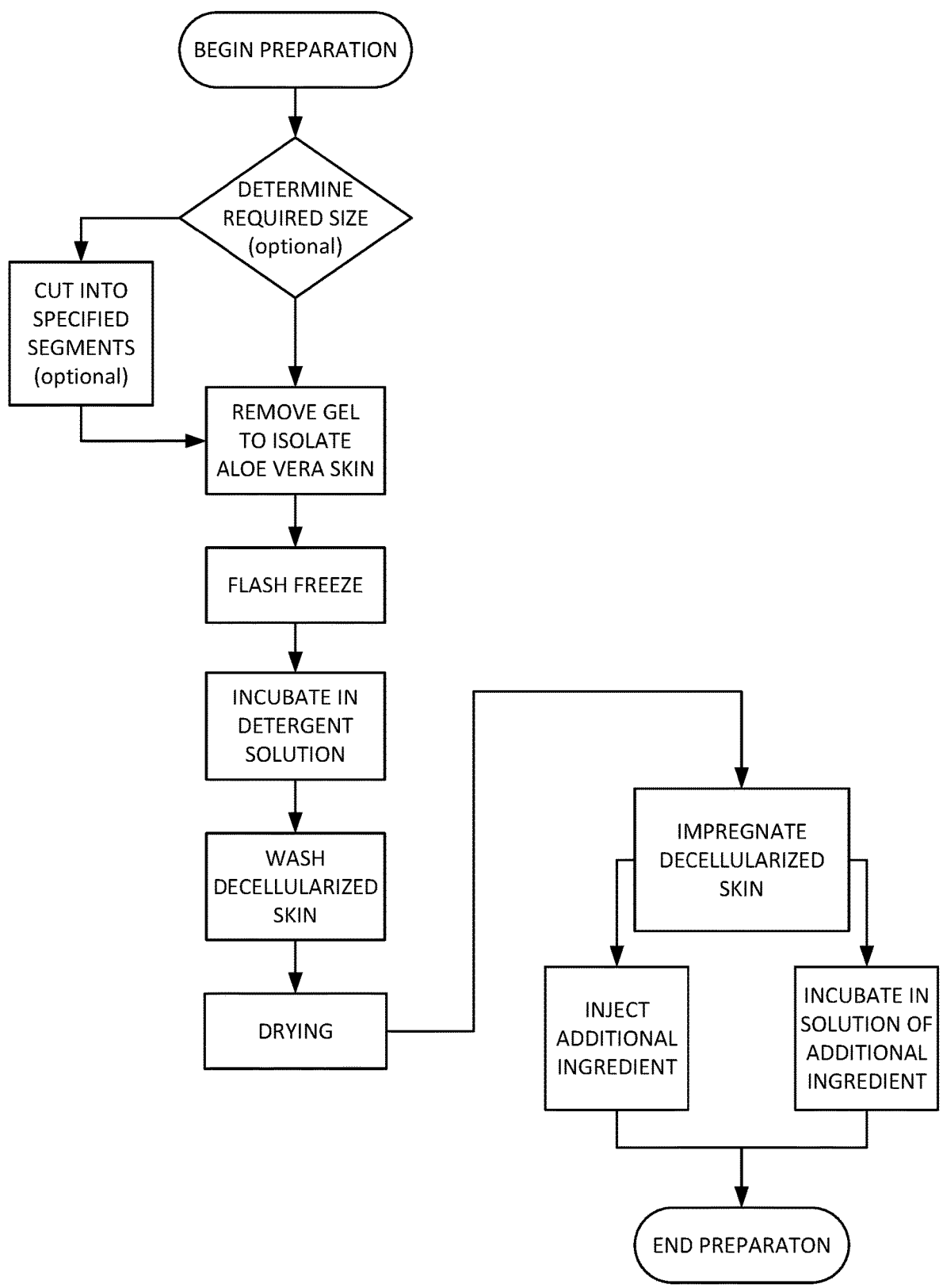
FIG. 11 depicts, in accordance with certain embodiments, a schematic of the process of decellularizing the aloe vera skin.

In another aspect, the versatility of the decellularized aloe vera skin as medical dressing may be enhanced by the inclusion of a pro-wound-healing compound. Exemplary pro-wound-healing compounds include vitamins that support the wound healing process, such as vitamin A, vitamin B (Vitamins B3, B5, B6, B7, B9, B10, and/or B12), vitamin C, vitamin D, and vitamin E. Thus, the method of producing plant-based medical dressing further comprises incubating the decellularized aloe vera skin with a solution comprising a pro-wound-healing compound. In other implementations, the method instead comprises injecting a pro-wound-healing compound into the veins of the decellularized aloe vera skin. In some embodiments, the method comprises impregnating the decellularized aloe vera skin with a pro-wound-healing compound and an antimicrobial agent. For example, the method comprises incubating the decellularized aloe vera skin with a solution comprising the pro-wound-healing compound and injecting an antimicrobial agent into the veins of the decellularized aloe vera skin (see, for example, FIG. 11). Thus, a medical dressing comprising decellularized aloe vera skin, an antimicrobial agent, and a pro-wound-healing compound is described herein.

In yet another aspect, the versatility of the decellularized aloe vera skin as medical dressing may be enhanced by the inclusion of a pain relief agent. Exemplary pain relief agent includes menthol or thymol. Thus, the method of producing plant-based medical dressing further comprises incubating the decellularized aloe vera skin with a solution comprising a pain relief agent. In other implementations, the method instead comprises injecting a pain relief agent into the veins of the decellularized aloe vera skin. In some embodiments, the method comprises impregnating the decellularized aloe vera skin with a pain relief agent with an antimicrobial agent and/or a pro-wound-healing compound (see, for example, FIG. 11). Thus, a medical dressing comprising decellularized aloe vera skin and a pain relief agent is described herein. In some aspects, the medical dressing further comprises an antimicrobial agent and/or a pro-wound-healing compound.

Also disclosed herein is an adhesive bandage comprising the described decellularized aloe vera skin. The adhesive bandage further comprises a bandage and an adhesive, wherein the adhesive provides organic adhesion of the decellularized aloe vera skin to the bandage. In certain embodiments, the adhesive bandage further comprises an antimicrobial agent, wherein the decellularized aloe vera skin is impregnated with the antimicrobial agent. In other embodiments, the adhesive bandage further comprises a pro-wound-healing compound, wherein the decellularized aloe vera skin is impregnated with the pro-wound-healing compound. In some embodiments, the adhesive bandage further comprises pain relief agent, wherein the decellularized aloe vera skin is impregnated with the pain relief agent.

EXAMPLES

The present invention is further illustrated by the following examples that should not be construed as limiting. The contents of all references, patents, and published patent applications cited throughout this application, as well as the Figures, are incorporated herein by reference in their entirety for all purposes.

I. Identifying the Optimal Detergent Solution to Decellularize Aloe Vera

Figure 2A:
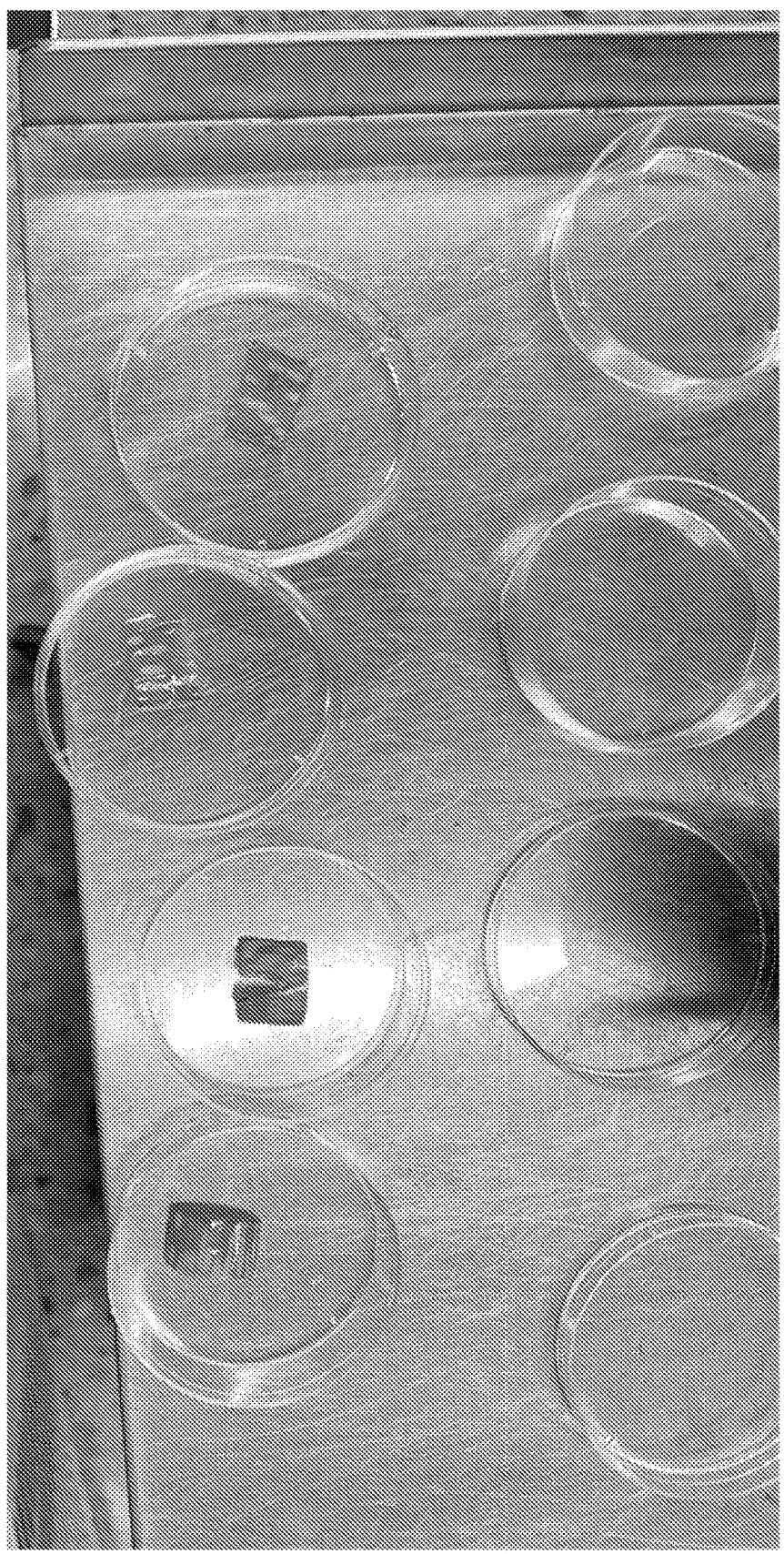
FIGS. 2A and 2B depict exemplary isolated aloe vera skin before (FIG. 2A) and after flash freezing (FIG. 2B) in −80° C.
Figure 2B:
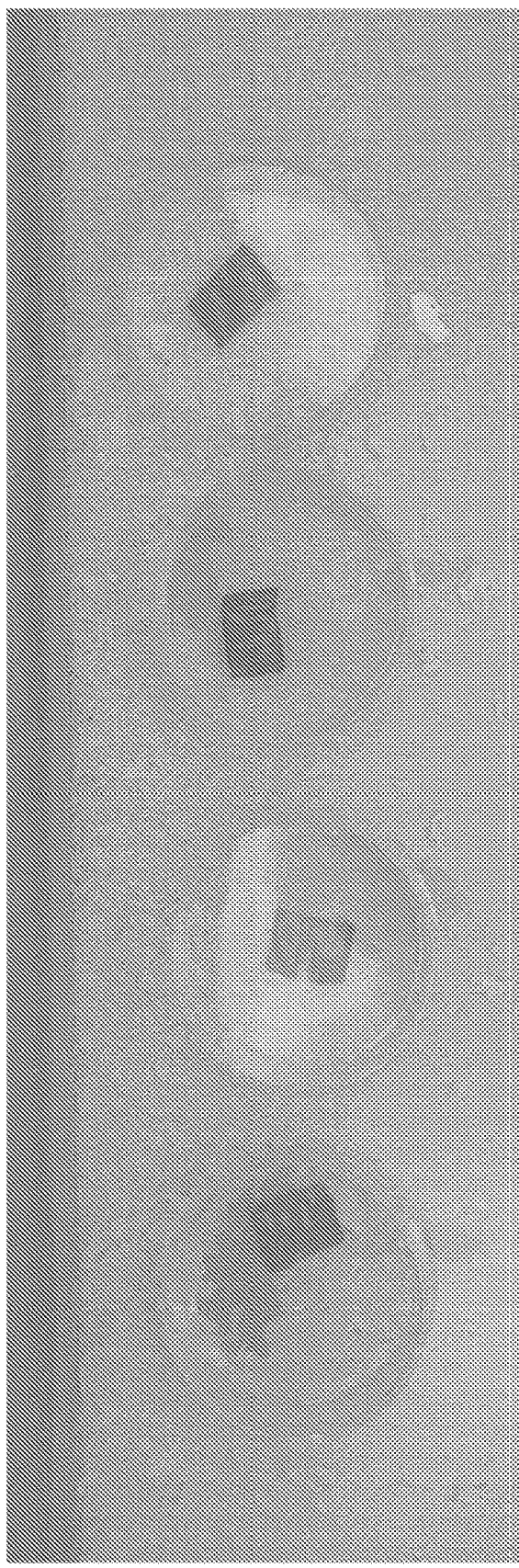
Figure 3A:
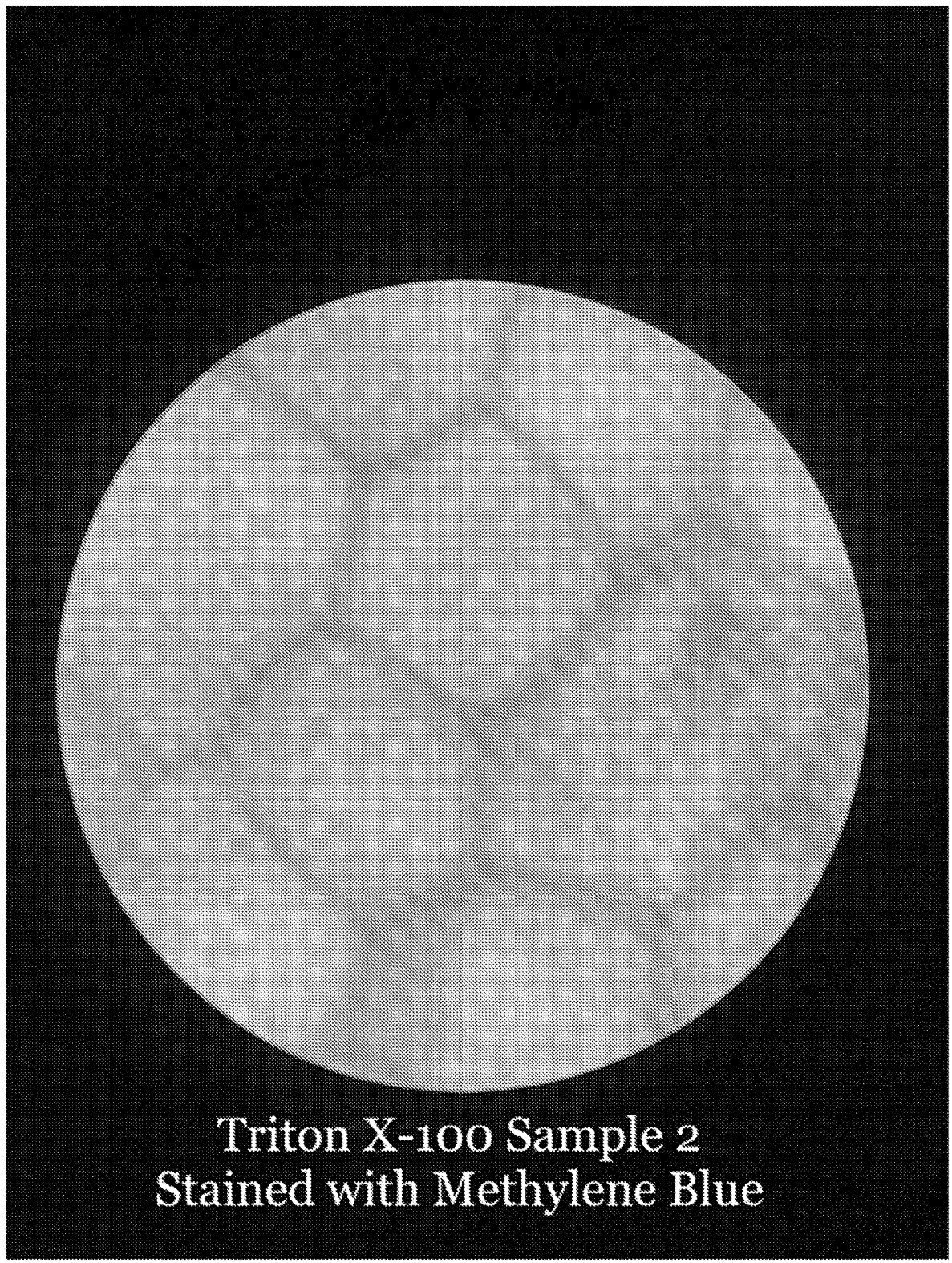
FIGS. 3A and 3B depict exemplary decellularized aloe vera skins stained with methylene blue (FIG. 3A) or turmeric (FIG. 3B) for visualizing the cellular structure at 100× magnification.
Figure 3B:
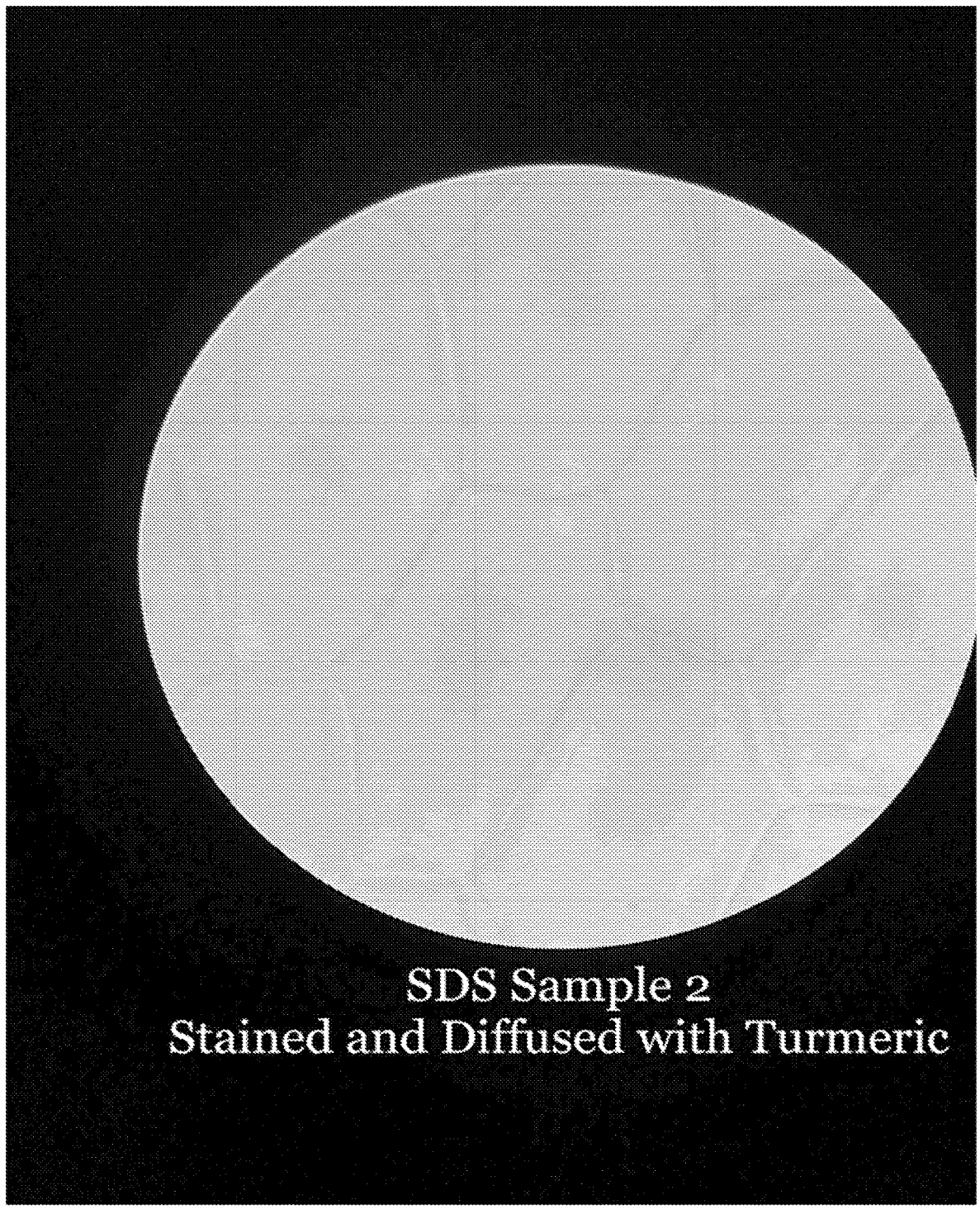
Figure 4A:
FIGS. 4A-4C are photographs of a representative aloe vera skin taken on Days 1-3 respectively of the decellularization process.
Figure 4B:
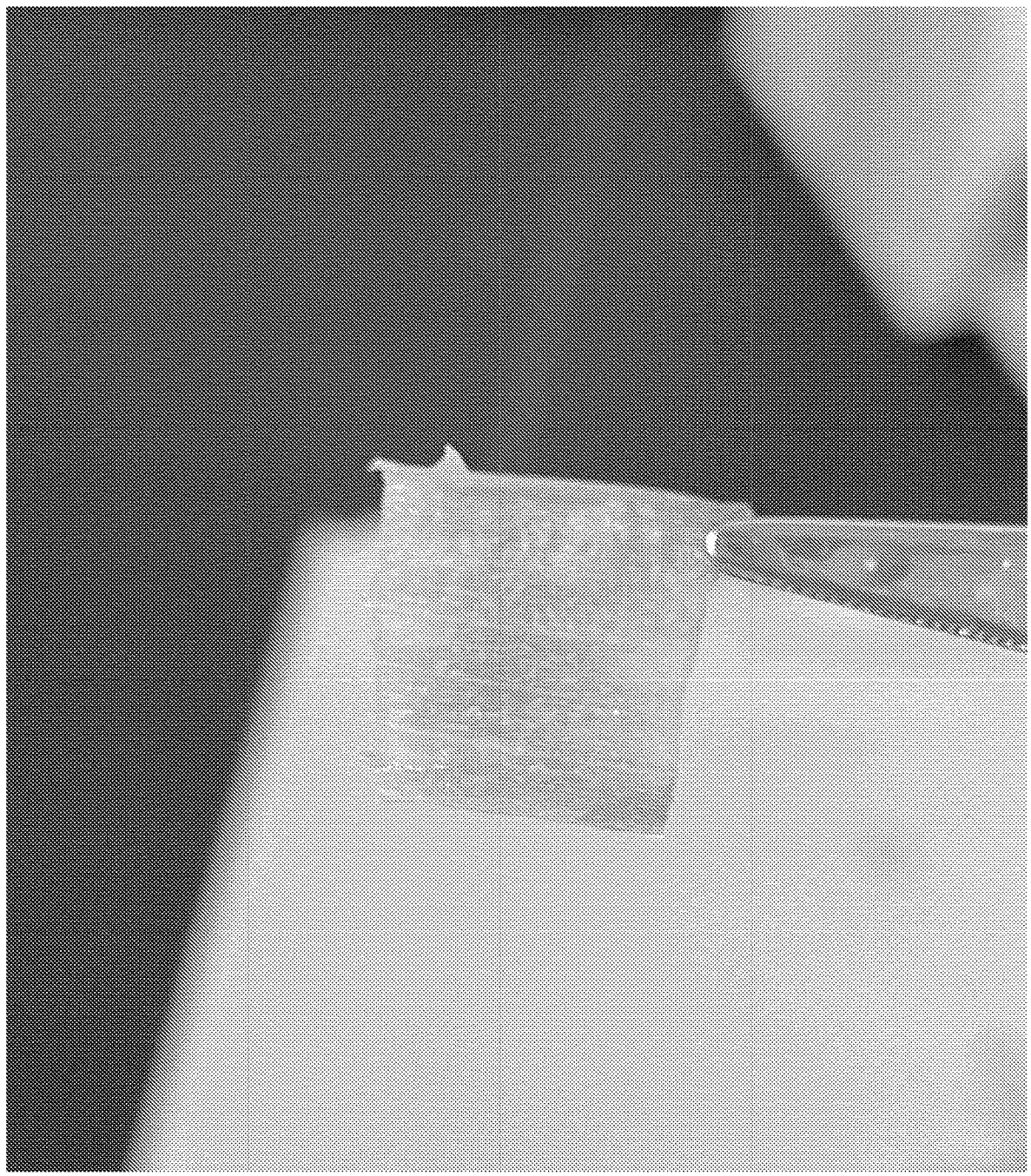
Figure 4C:
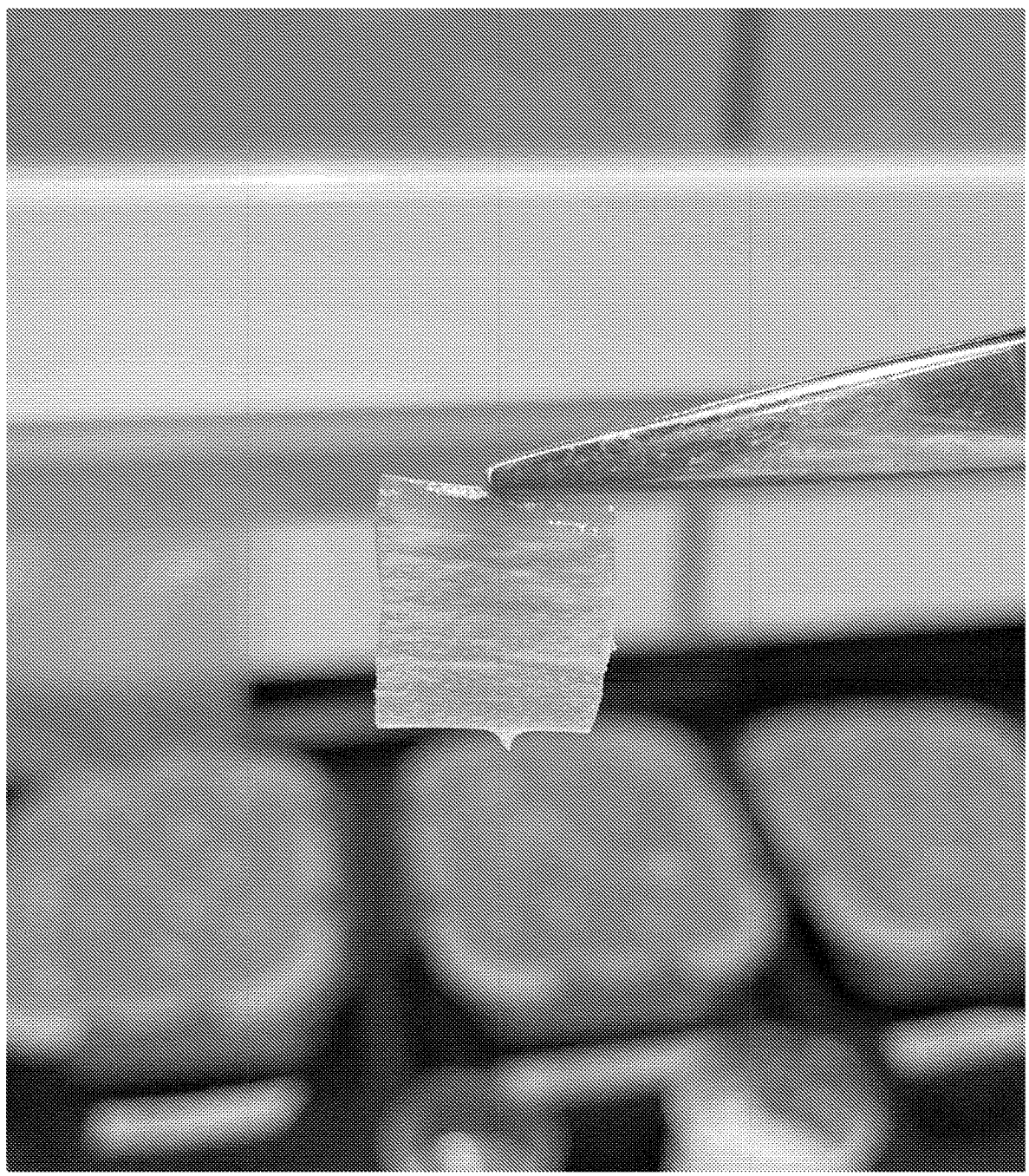
Figure 5A:
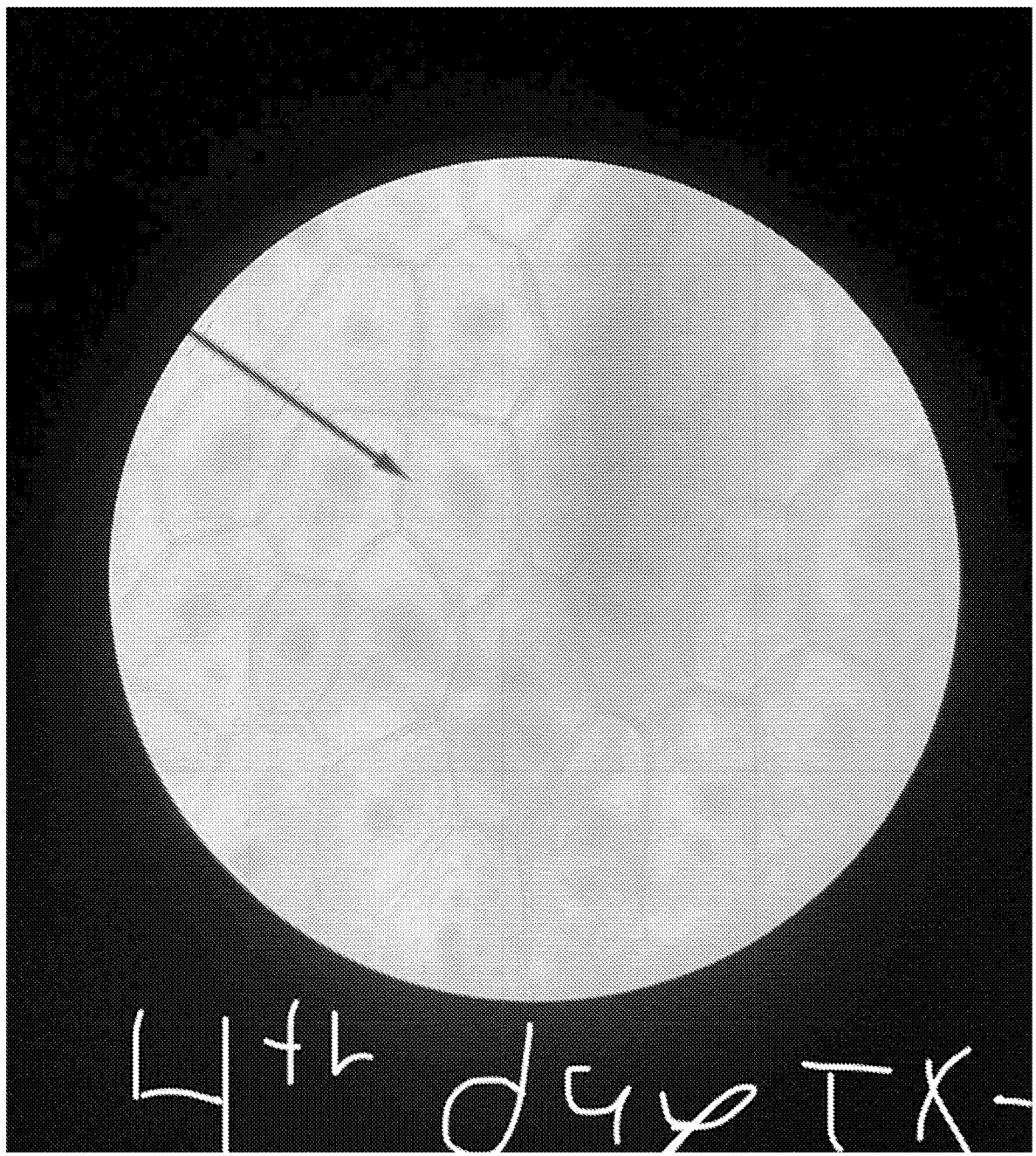
FIGS. 5A and 5B depict representative results of decellularization using Triton X-100 or SDS on the fourth day of treatment. 100× magnification.
Figure 5B:
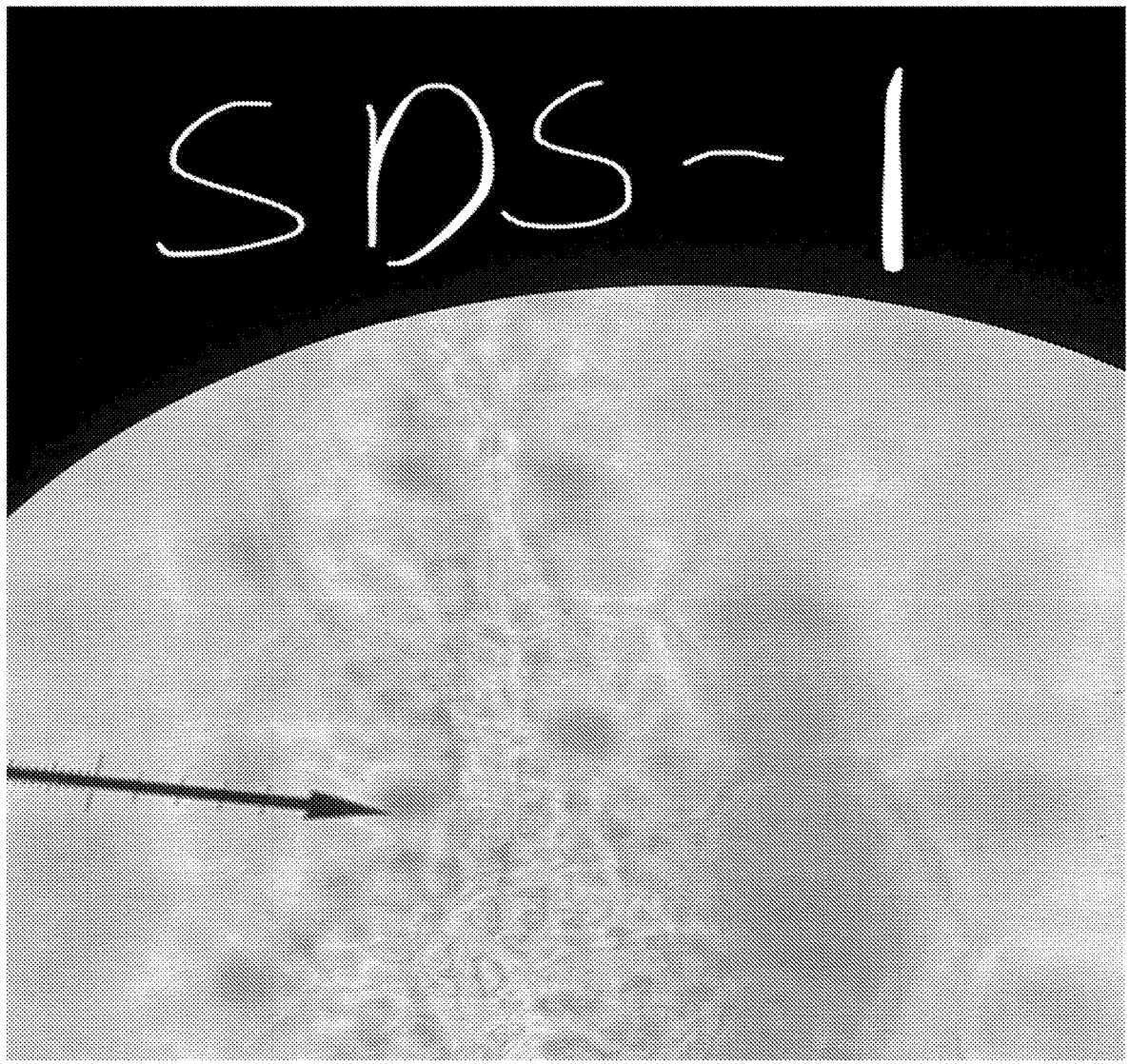
Figure 6A:
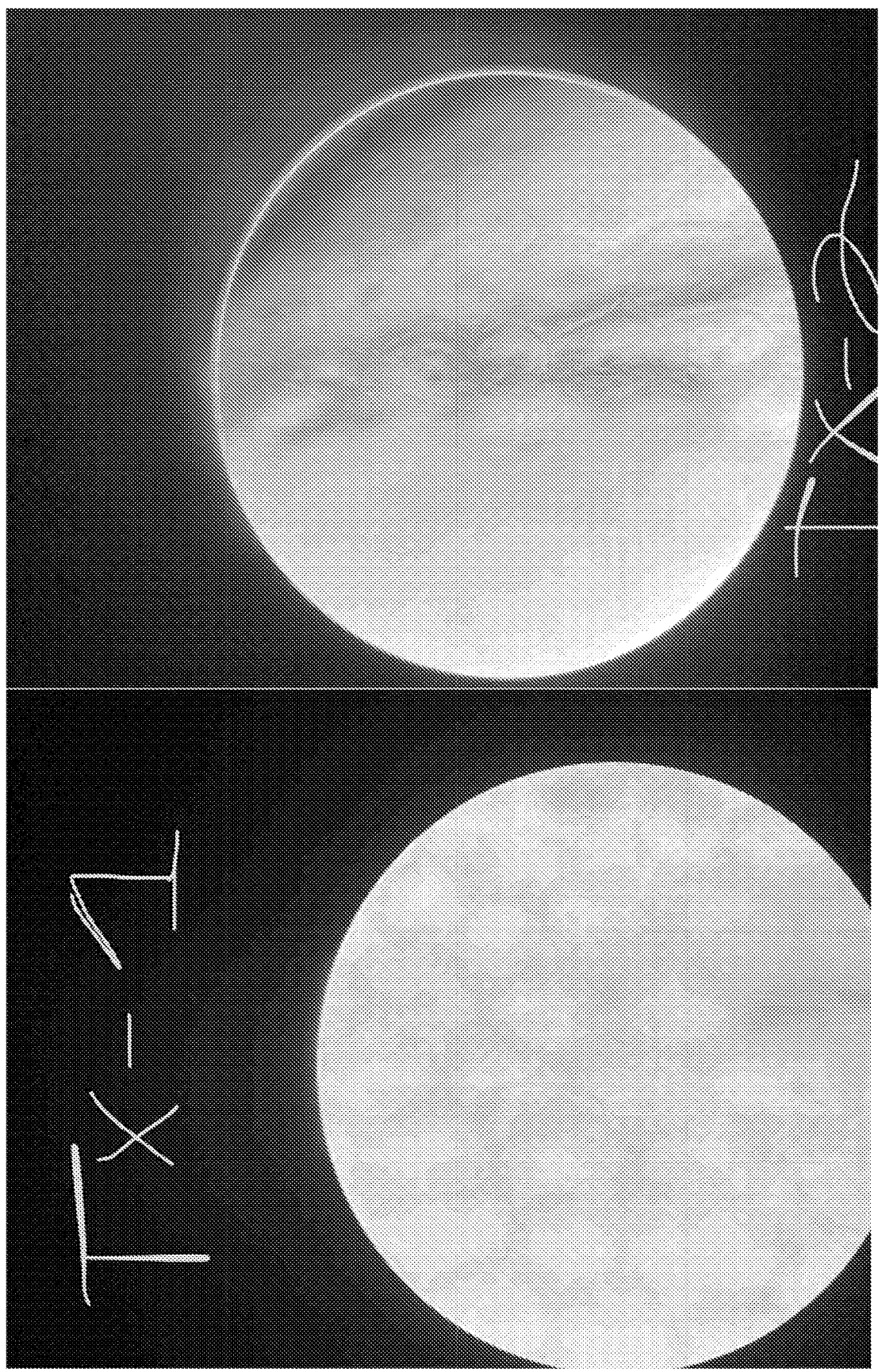
FIGS. 6A and 6B, depict representative results of decellularization using Triton X-100 or SDS on the fifth day of treatment. 100× magnification.
Figure 6B:
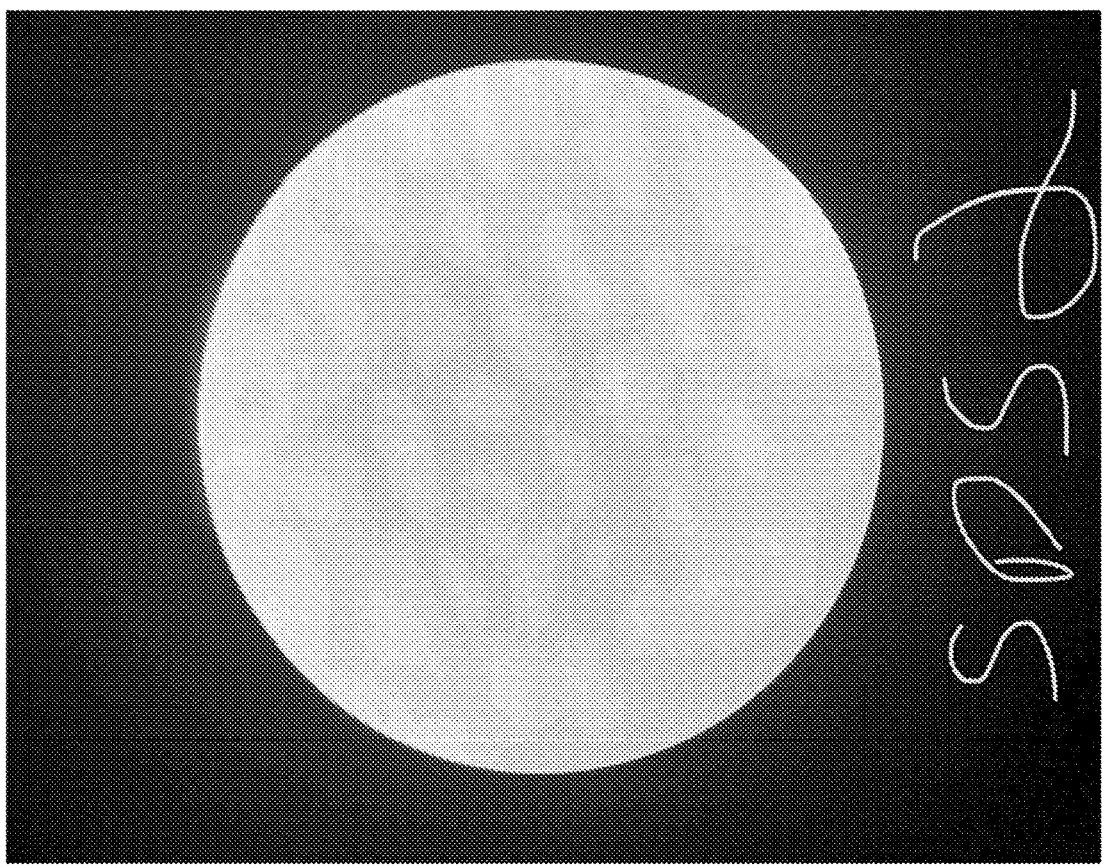
Figure 6B:
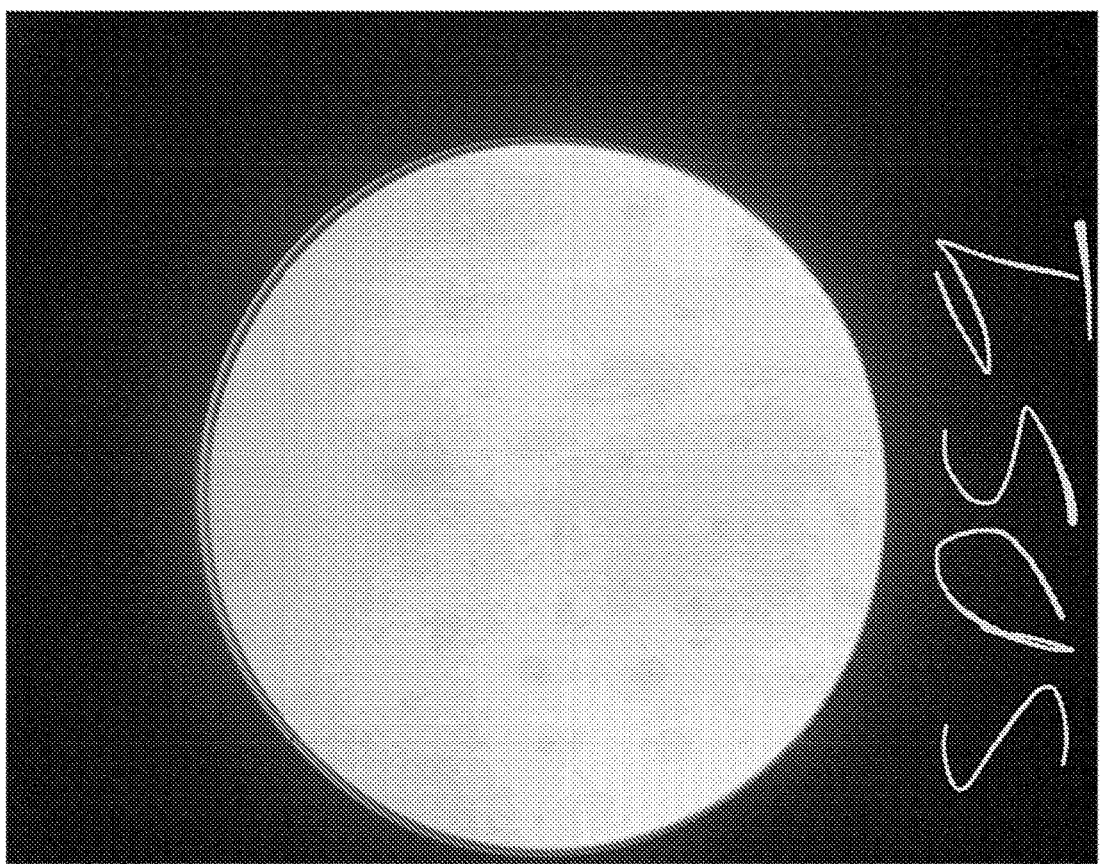
Figure 7B:
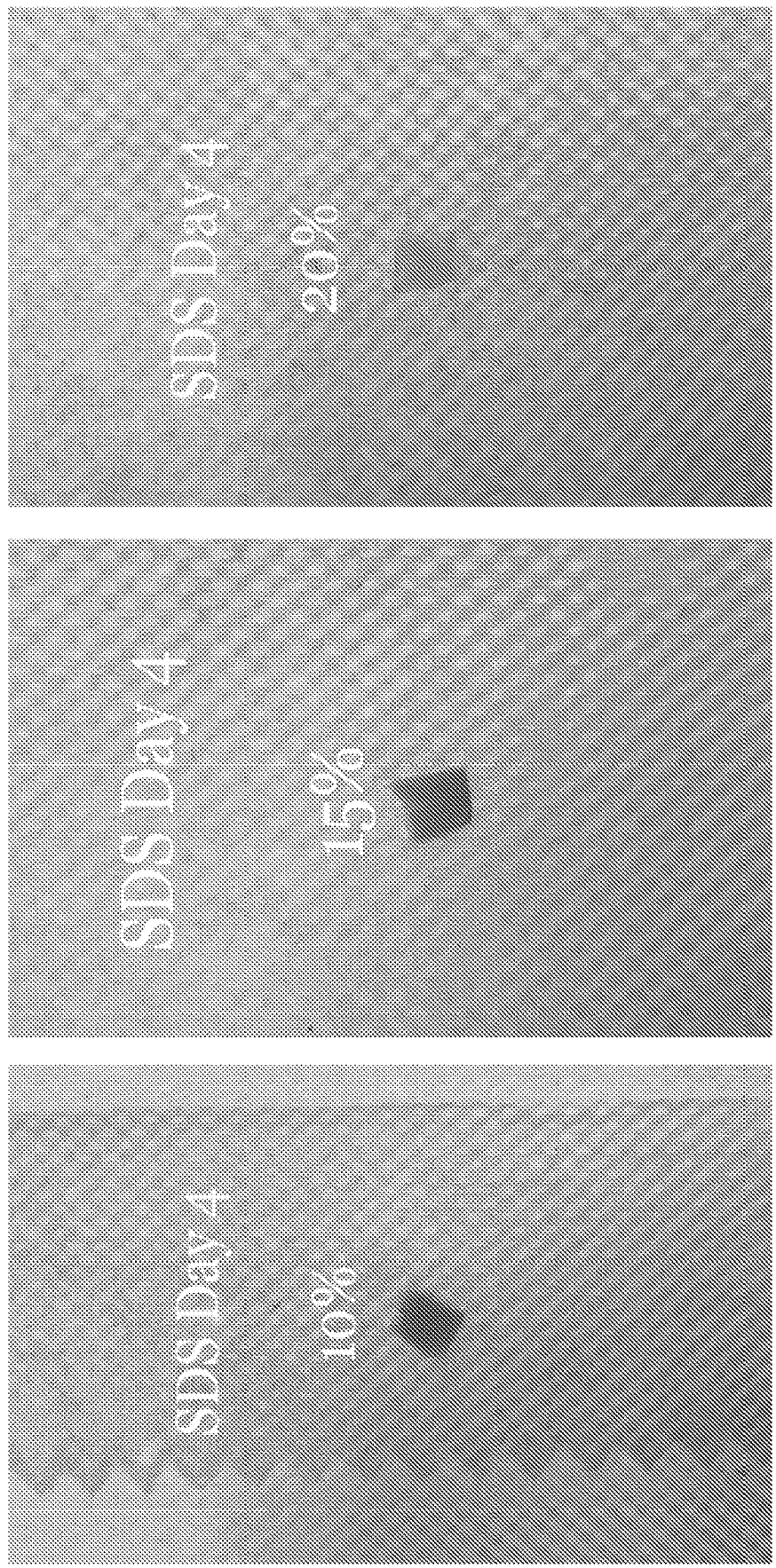
Figure 8A:
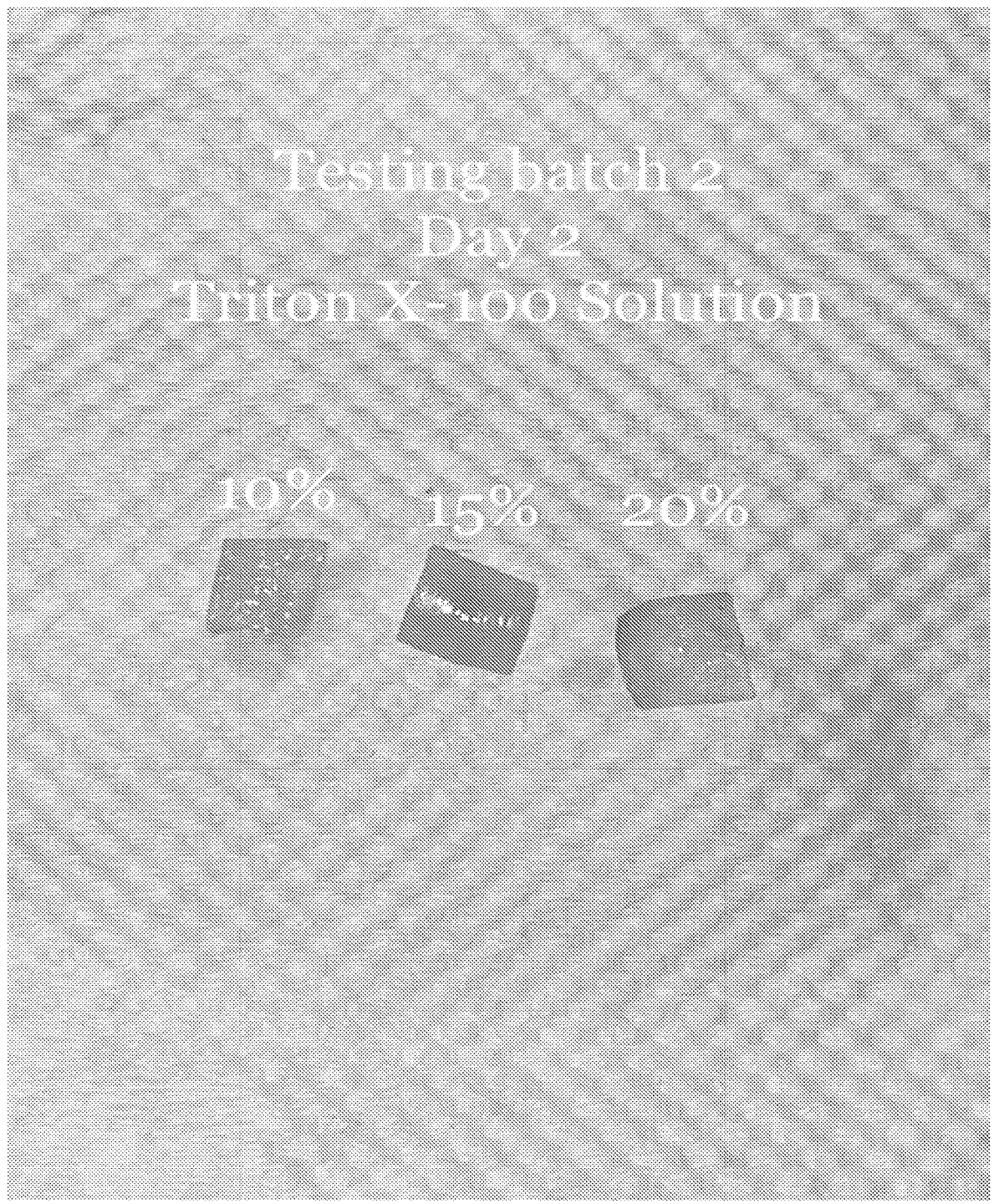
FIGS. 8A and 8B show photographs of the nine portions of aloe vera skin after two days of treatment in their respective concentrations of the Triton X-100 solution.
Figure 8B:
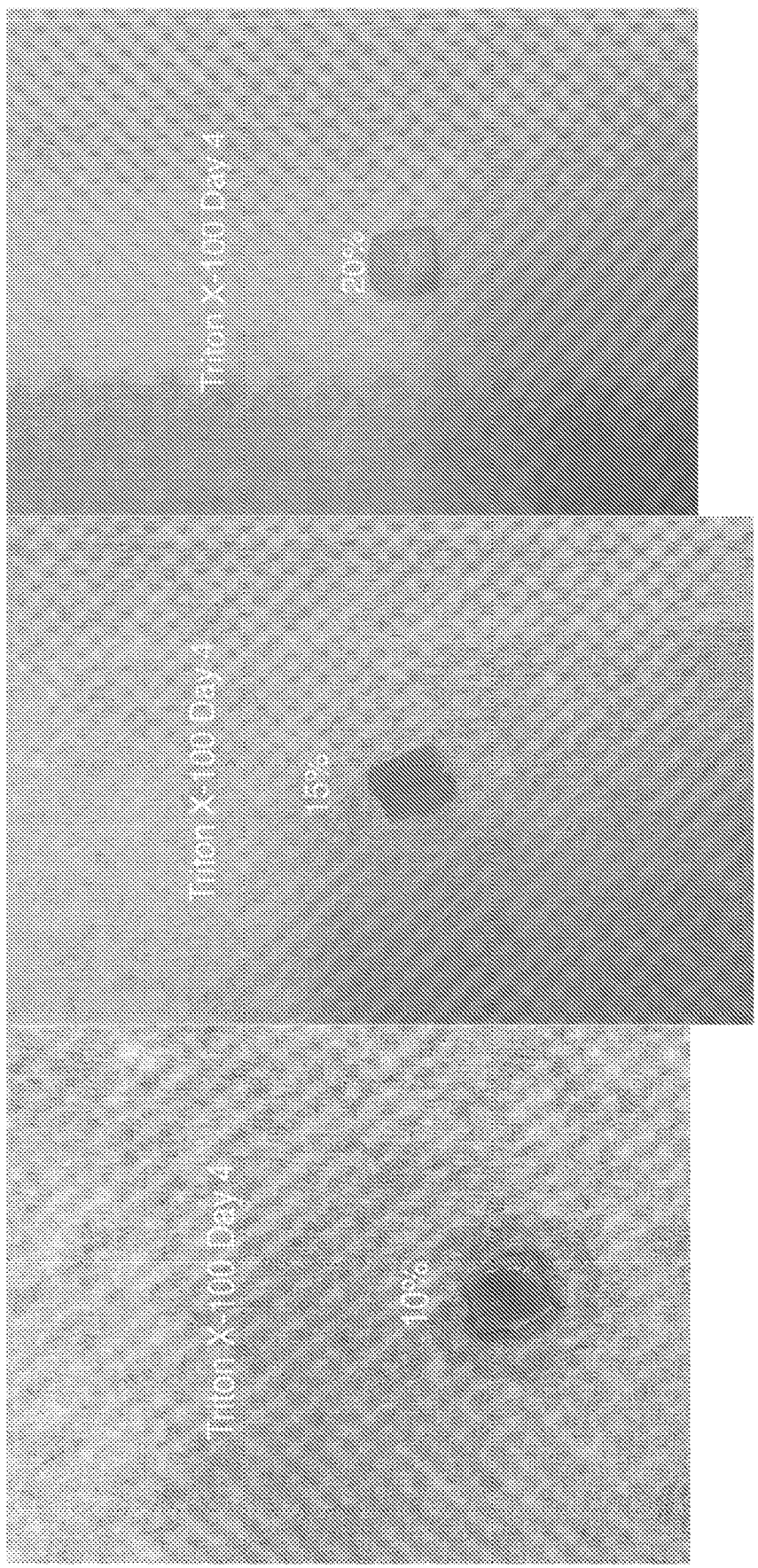
Figure 9A:
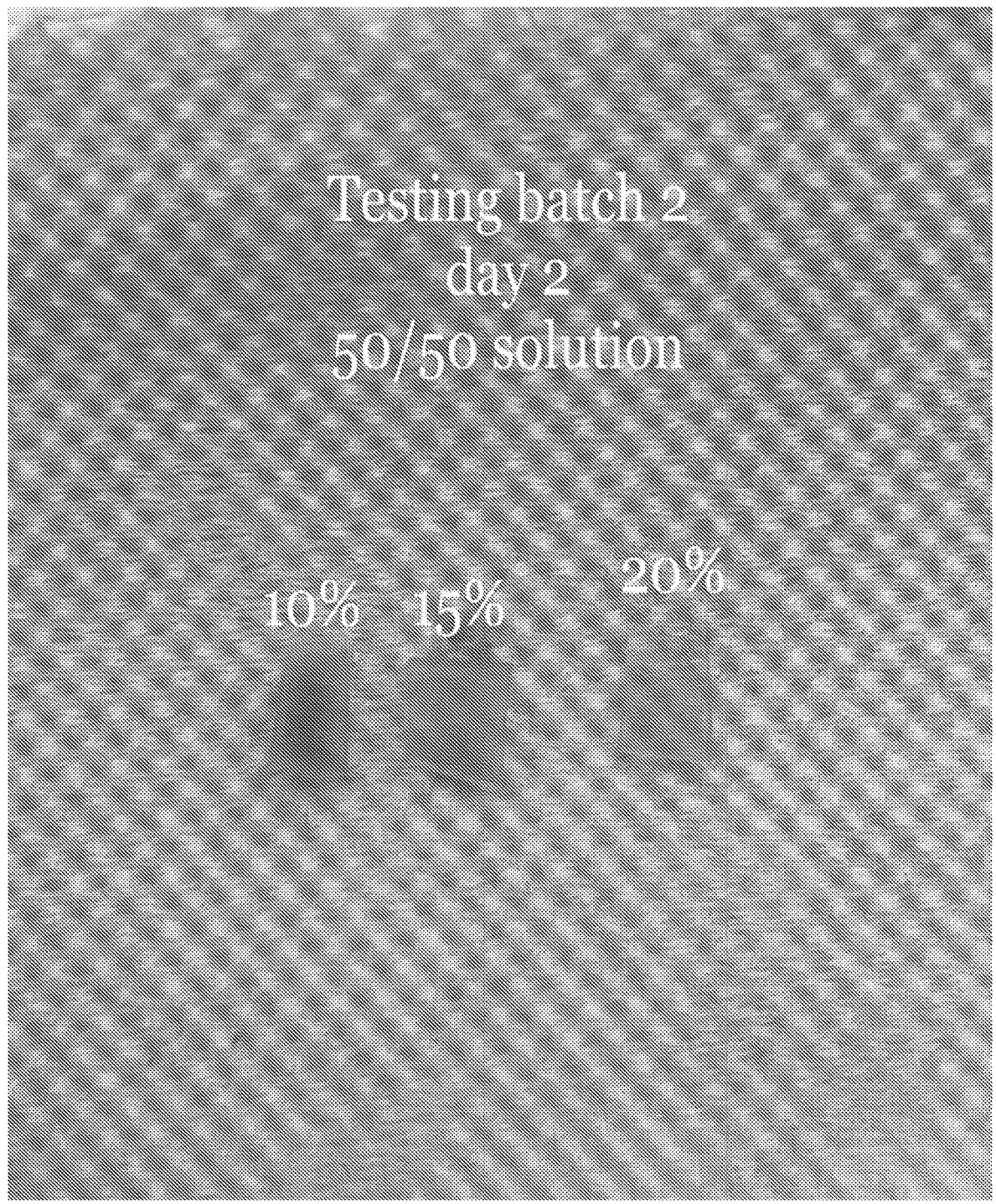
FIGS. 9A and 9B show photographs of the nine portions of aloe vera skin after two days of treatment in their respective concentrations of the 50/50 solution.
Figure 9B:
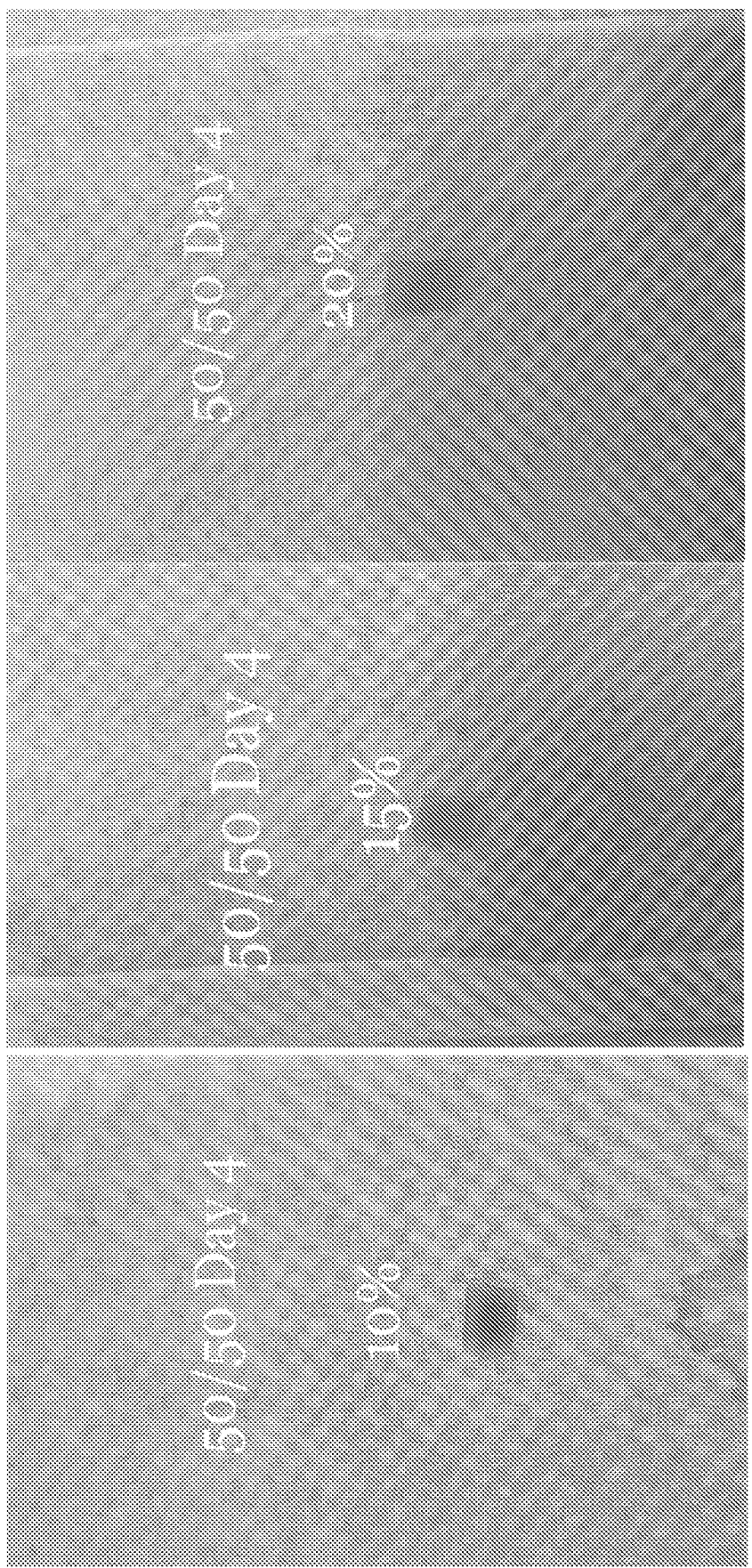
Figure 10A:
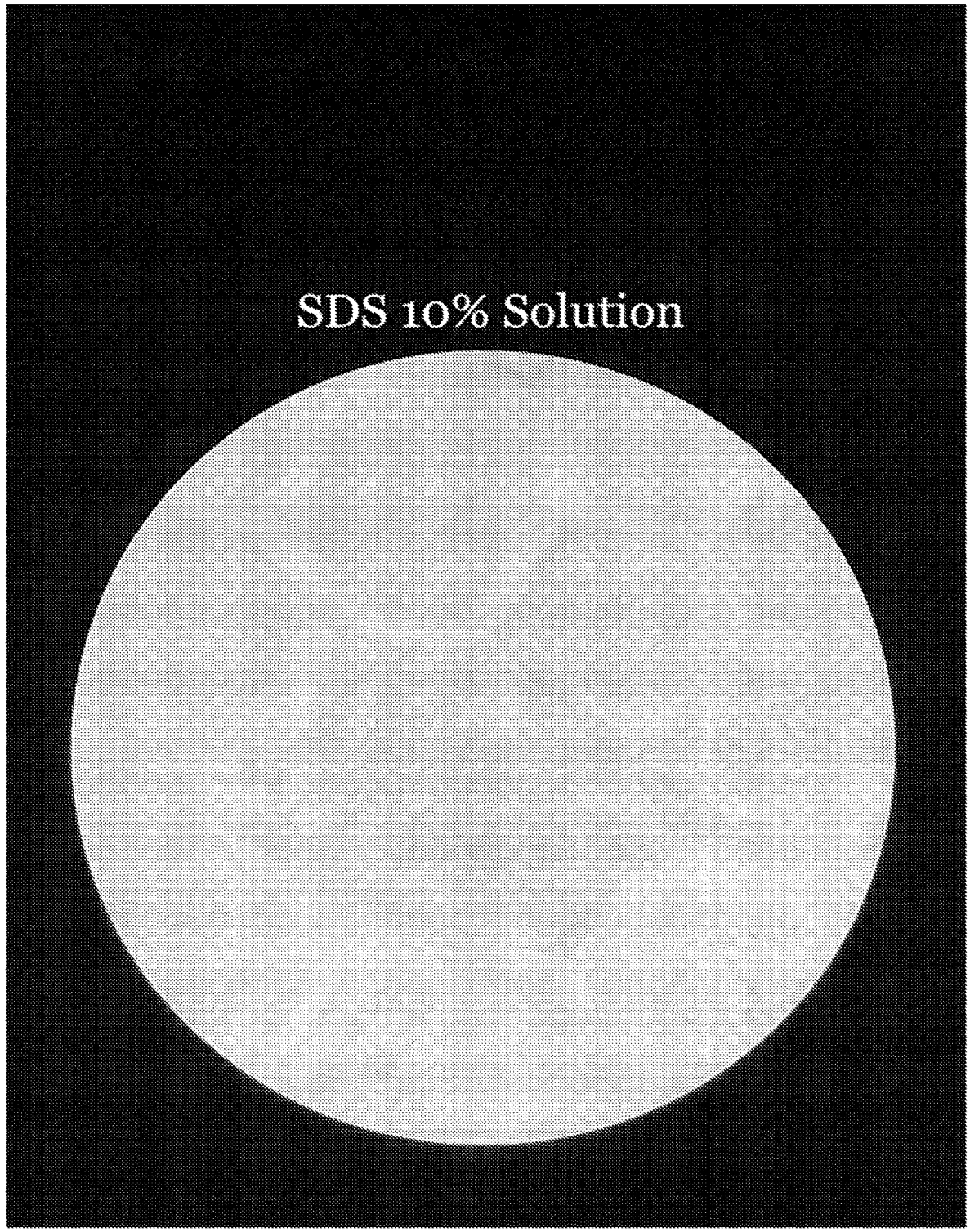
FIGS. 10A-10F show photographs of the portions of aloe vera under the microscope after five days of treatment in their respective detergent solutions. 100× magnification.
Figure 10B:
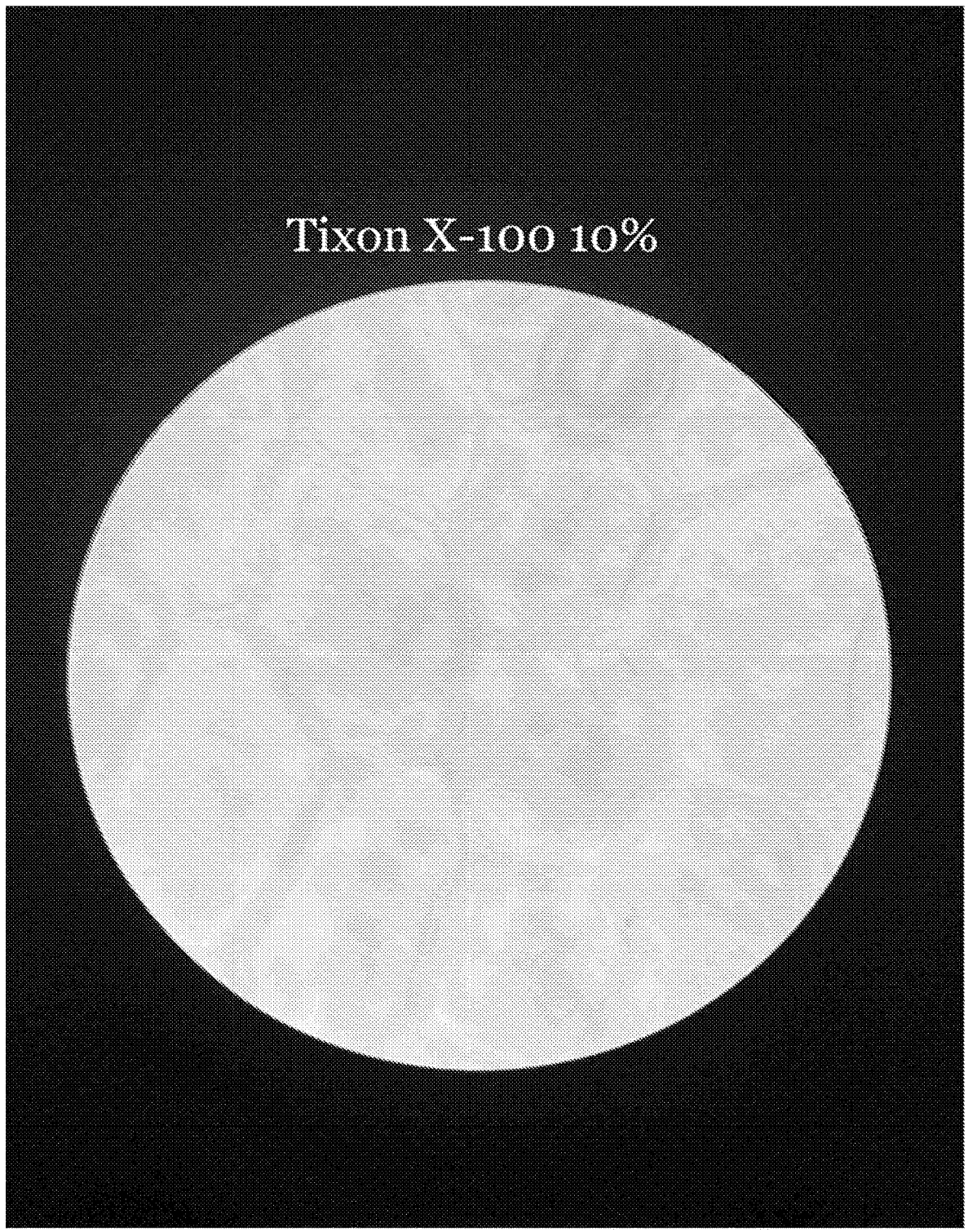
Figure 10C:
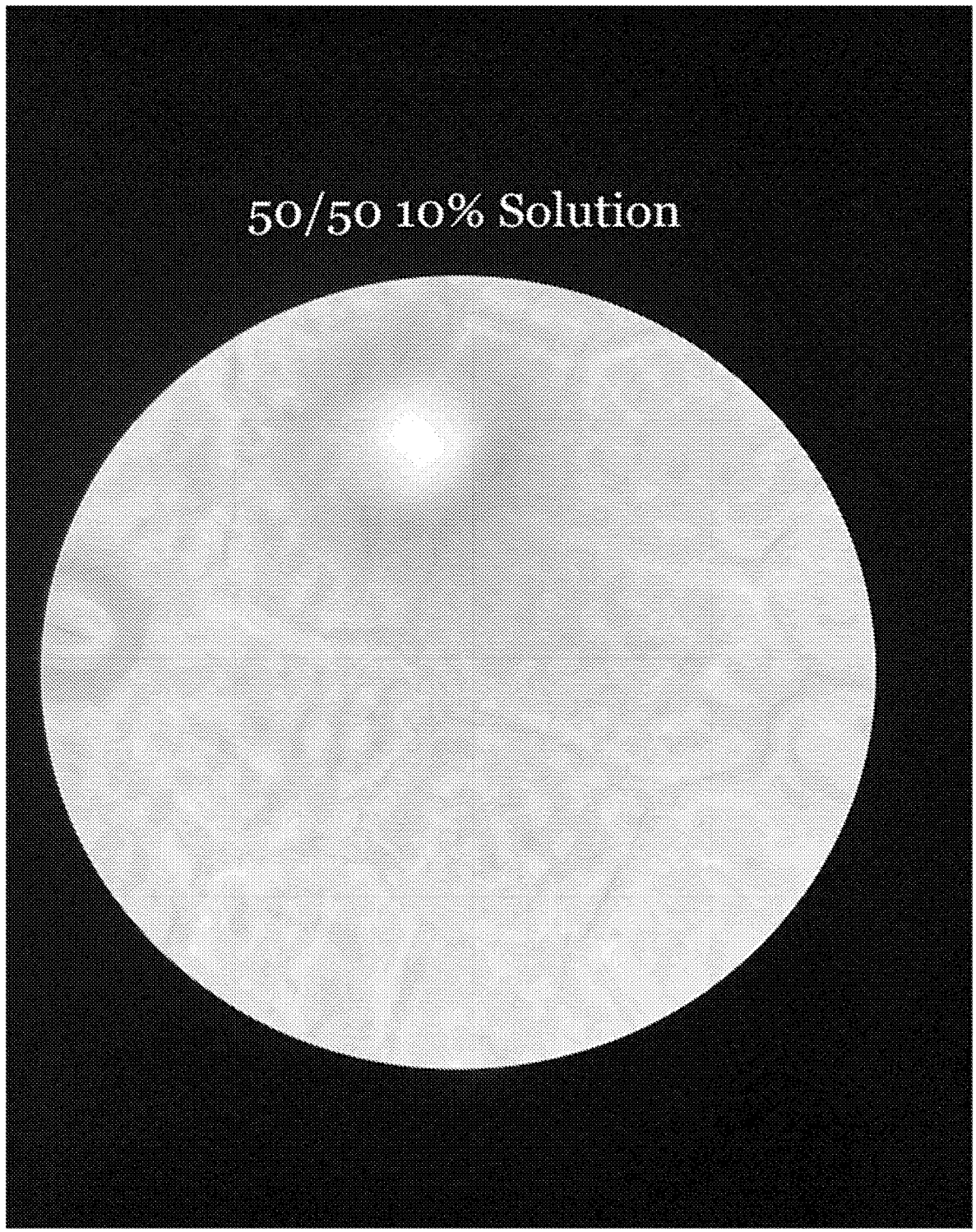
Figure 10D:
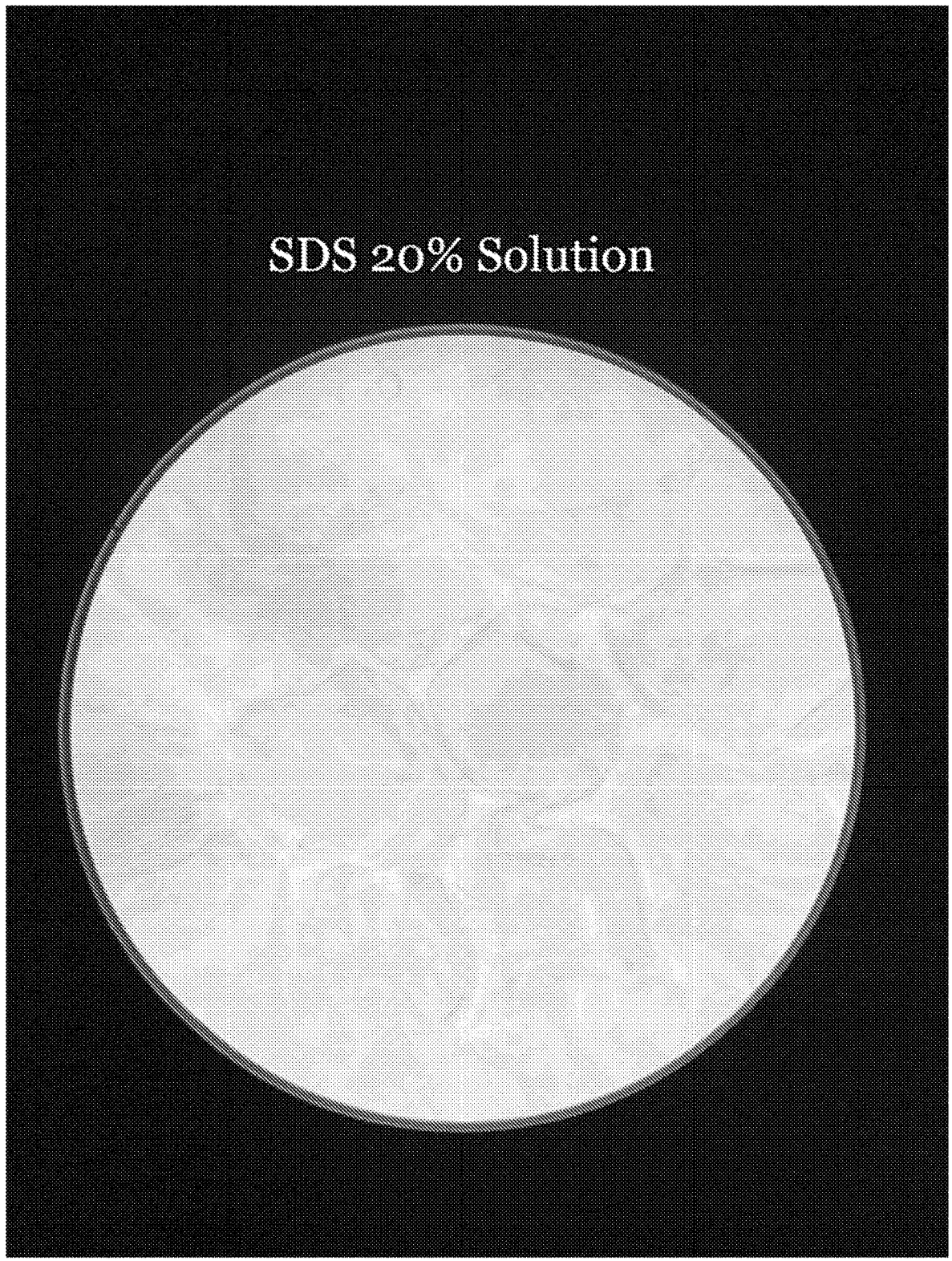
Figure 10E:
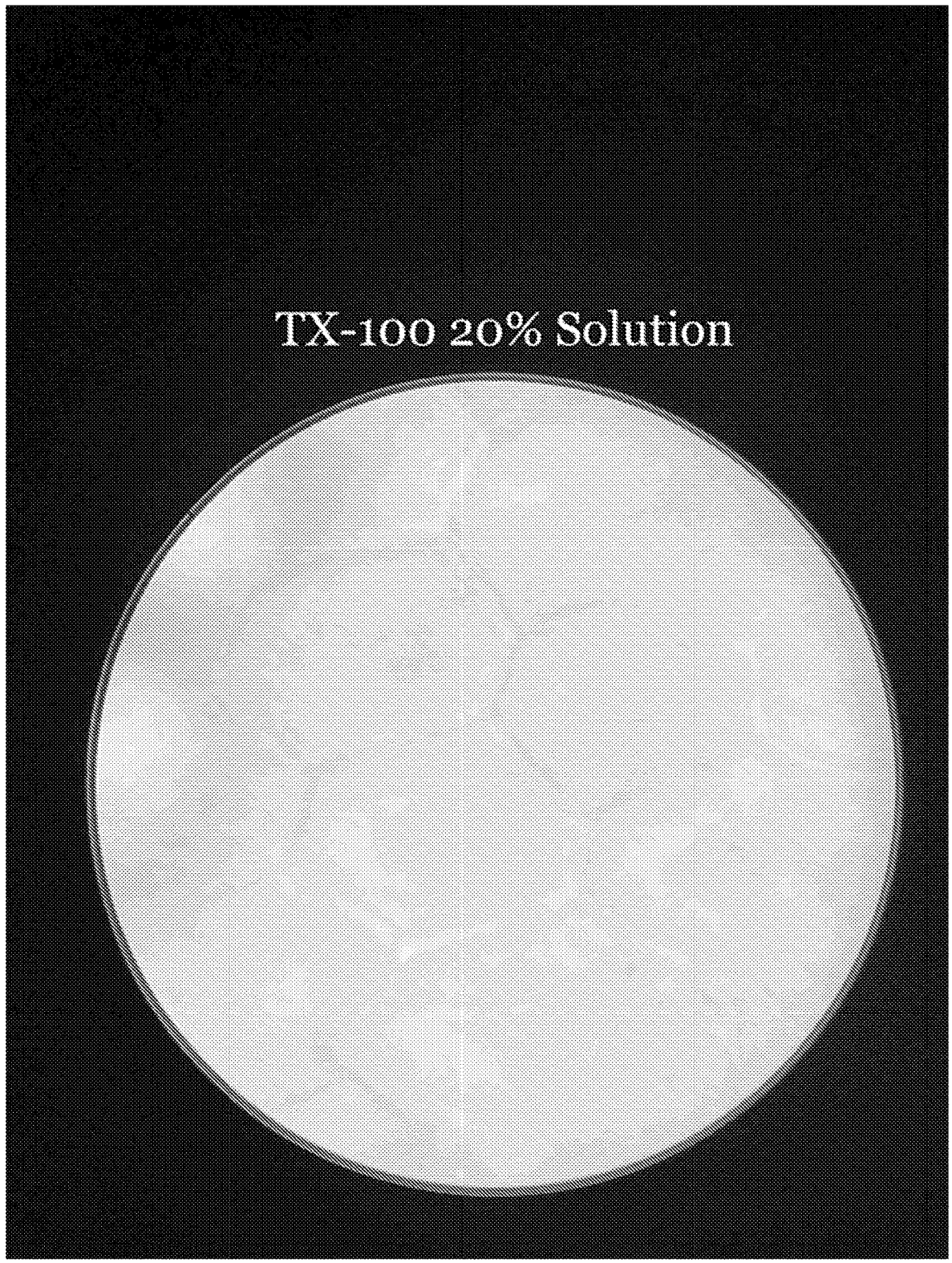
Figure 10F:
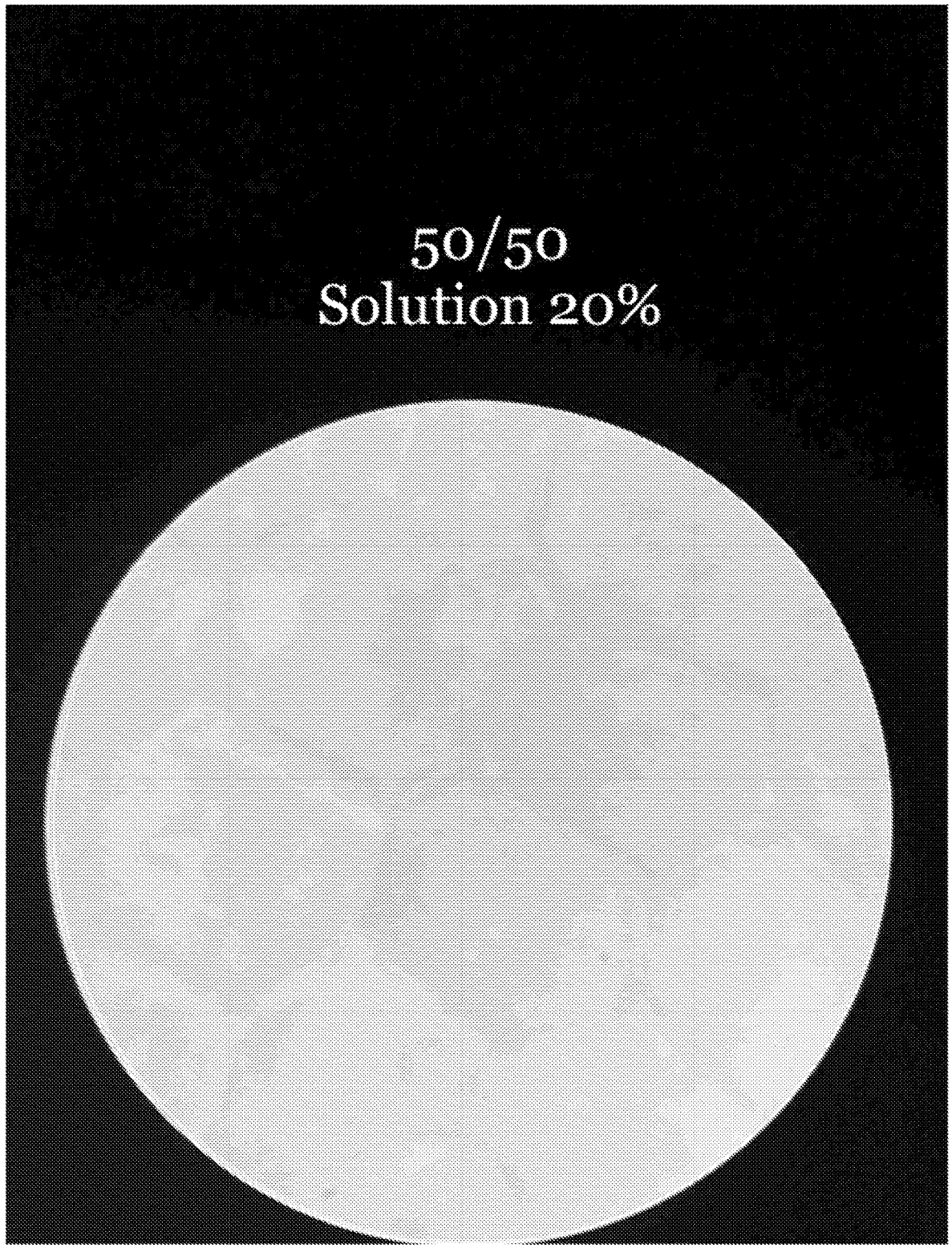

An *Aloe barbadensis* Miller (aloe vera) leaf was cut into 1 cm portions with equal length, girth, and width. The skin was separated from the aloe vera leaf by scraping off the aloe vera gel. The isolated aloe vera portions were between 1 mm and 5 mm thick (FIG. 1). After separation from the rest of the leaf, the aloe vera skin was rinsed with deionized water. Each portion of aloe vera skin was placed in individual petri dishes and stored in an −80° C. freezer for 7 hours for flash freezing (FIGS. 2A and 2B).

Table 1 lists the detergent solutions prepare to decellularize the aloe vera skin. The aloe vera skin were treated with the detergent solutions for five days (in beakers covered with parafilm). Every 24 hours, each portion was rinsed and analyzed for decellularization progress and then returned to fresh detergent solution. On the fourth and fifth day of treatment, the samples were also inspected under a microscope, which revealed the decellularized and detergent perfused extracellular matrix.

TABLE 1

| Solution | Final Detergent Concentration | Recipe |
| --- | --- | --- |
| Sodium dodecyl sulfate (SDS) | 1% SDS | Dissolve 1 g SDS into 99 ml deionized water |
| Triton X-100 | 10% Triton X-100 | Combine 10 ml Triton X-100 with 90 ml deionized water |

Each cell was accounted for, checking for any residue, nuclear material, or general cellular makeup. To visualize the tissue, one aloe vera skin sample treated with the Triton X-100 solution was stained with methylene blue, while one aloe vera skin sample treated with the SDS solution was stained and diffused with turmeric.

As shown in FIGS. 5A-6B, both Triton X-100 and SDS can in decellularize aloe vera skin. However, Triton X-100 was better in removing cellular/nuclear material from within the extracellular matrix. The tested Triton X-100 solution seemed to negatively affect the extracellular matrix, but this effect could be mitigated by controlling the incubating time and concentration of Triton X-100 in the detergent solution.

II. Comparison on Different Detergent Solutions in Decellularizing Aloe Vera

An aloe vera leaf was cut into 1 cm portions with equal length, girth, and width. The rind was separated from the leaf by scraping off the aloe vera gel. The isolated rind portions were between 1 mm and 5 mm thick. After separation from the rest of the leaf, the rind was rinsed with deionized water. Each piece of aloe vera rind was in individual petri dishes and stored in an −80° C. freezer for flash freezing.

Table 2 lists the detergent solutions prepare to decellularize the aloe vera skin. The aloe vera skin were treated with the detergent solutions for five days (in beakers covered with parafilm). Every 24 hours, each sample was rinsed and analyzed for decellularization progress and then returned to fresh detergent solution. On the fourth and fifth day of treatment, the samples were also inspected under a microscope, which revealed the decellularized and detergent perfused extracellular matrix.

TABLE 2

| Solution | Recipe | Final Concentration |
| --- | --- | --- |
| 10% SDS | Dissolve 10 g SDS into 90 ml deionized water; bring final volume to 100 ml with deionized water | 10% SDS |
| 15% SDS | Dissolve 15 g SDS into 85 ml deionized water; bring final volume to 100 ml with deionized water | 15% SDS |
| 20% SDS | Dissolve 20 g SDS into 80 ml deionized water; bring final volume to 100 ml with deionized water | 20% SDS |
| 10% Triton X-100 | Combine 10 ml Triton X-100 solution with 90 ml deionized water | 10% Triton X-100 |
| 15% Triton X-100 | Combine 15 ml Triton X-100 solution into 85 ml deionized water | 15% Triton X-100 |
| 20% Triton X-100 | Combine 20 ml Triton X-100 solution into 80 ml deionized water | 20% Triton X-100 |
| 10% 50/50 | Combine 50 ml 10% Triton X-100 and 50 ml | 5% Triton |

TABLE 2-continued

| Solution | Recipe | Final Concentration |
|---|---|---|
| Solution | 10% SDS | X-100 5% SDS |
| 15% 50/50 Solution | Combine 50 ml 15% Triton X-100 and 50 ml 15% SDS | 7.5% Triton X-100 7.5% SDS |
| 20% 50/50 Solution | Combine 10 g SDS and 20 ml Triton X-100 with 80 ml deionized water | 20% Triton X-100 10% SDS |

Nine portions of aloe vera skin from one aloe vera leaf were used to test the decellularization effectiveness of nine detergent solutions. The aloe vera skin portions were treated with the detergent solution for five days, and the decellularization progress was measured on the second, fourth, and final fifth result day. Tissue staining was performed utilizing methylene blue as the staining agent.

As shown with the examination under a microscope in FIGS. 10A-10E, dilutions of the Triton X-100-based detergent solution provided the best results without negatively affecting the extracellular matrix. SDS alone in the detergent solution did not produce comparable results within the same treatment time. The dilutions of the 50/50 solution produced were also suitable to decellularized aloe vera skin. Specifically, the 50/50 20% solution provided the best results.

What is claimed is:

1. A method of producing medical dressing, the method comprising:
   isolating aloe vera skin from an aloe vera leaf;
   storing the aloe vera skin in temperature of less than 0° C. to produce a flash-frozen aloe vera skin; and
   incubating the flash-frozen aloe vera skin in a detergent solution comprising at least 5% polyethylene glycol mono(4-tert-octylphenyl) for at least four days, thereby producing a decellularized aloe vera skin for use as medical dressing.

2. The method of claim 1, wherein the detergent solution further comprises at least 1% sodium dodecyl sulfate (SDS).

3. The method of claim 2, wherein the detergent solution further comprises at 1%-20%sodium dodecyl sulfate (SDS).

4. The method of claim 3, wherein the detergent solution comprises 5% polyethylene glycol mono(4-tert-octylphenyl) and 5% SDS, 7.5% polyethylene glycol mono(4-tert-octylphenyl) and 7.5% SDS, 10% polyethylene glycol mono(4-tert-octylphenyl) and 10% SDS, or 20% polyethylene glycol mono(4-tert-octylphenyl) and 10% SDS.

5. The method of claim 1, wherein the detergent solution consists of Triton X-100 and water.

6. The method of claim 5, wherein the concentration of polyethylene glycol mono(4-tert-octylphenyl) in the detergent solution is about 5%-20%.

7. The method of claim 6, wherein the detergent solution is about 5%, about 7.5%, about 10%, about 15%, or about 20% polyethylene glycol mono(4-tert-octylphenyl).

8. The method of claim 1, wherein the aloe vera skin is stored in temperature of less than 0° C. for 10 minutes to 8 hours to produce the flash-frozen aloe vera skin.

9. The method of claim 8, wherein the aloe vera skin is stored in liquid nitrogen.

10. The method of claim 8, wherein the aloe vera skin is stored in temperature of about −40° C. or about −80° C.

11. The method of claim 1, wherein the aloe vera skin is less than 5 nm thick.

12. The method of claim 1, further comprising:
   washing the decellularized aloe vera skin to remove the detergent solution; and
   incubating the washed, decellularized aloe vera skin with a solution comprising at least one ingredient selected from the group consisting of: an antimicrobial agent, a pro-wound-healing compound, and a pain relief agent.

13. The method of claim 12, further comprising:
   drying the decellularized aloe vera skin.

14. The method of claim 1, further comprising:
   washing the decellularized aloe vera skin to remove the detergent solution; and
   injecting at least one ingredient selected from the group consisting of: an antimicrobial agent, a pro-wound-healing compound, and a pain relief agent into veins of the washed, decellularized aloe vera skin.

15. The method of claim 1, further comprising:
   washing the decellularized aloe vera skin to remove the detergent solution; and
   drying the decellularized aloe vera skin.

16. A medical dressing comprising decellularized aloe vera skin produced according to the method of claim 15.

17. A medical dressing produced according to the method of claim 12, wherein the medical dressing comprises decellularized aloe vera skin and the antimicrobial agent.

18. A medical dressing produced according to the method of claim 14, wherein the medical dressing comprises decellularized aloe vera skin and the antimicrobial agent.

19. An adhesive bandage comprising:
   a bandage;
   the decellularized aloe vera skin produced according to the method of claim 1; and
   an adhesive, wherein the adhesive provides organic adhesion of the decellularized aloe vera skin to the bandage.

20. An adhesive bandage comprising:
   a bandage;
   a medical dressing comprising:
      decellularized aloe vera skin; and
      an additional ingredient selected from the group consisting of: an antimicrobial agent, a pro-wound-healing compound, and a pain relief agent; and
   an adhesive,
   wherein:
   the medical dressing is produced according to the method of claim 12; and
   the adhesive provides organic adhesion of the decellularized aloe vera skin to the bandage.

* * * * *